United States Patent
Palanisamy et al.

(10) Patent No.: US 11,019,566 B2
(45) Date of Patent: *May 25, 2021

(54) SERVICE CAPABILITY SERVER / EPC COORDINATION FOR POWER SAVINGS MODE AND PAGING

(71) Applicant: Convida Wireless, LLC, Wilmington, DE (US)

(72) Inventors: Suresh Palanisamy, Tamilnadu State (IN); Michael F. Starsinic, Newtown, PA (US); Quang Ly, North Wales, PA (US); Jasvir Singh Ramam, Punjab (IN); Darshan Appajigowda, Bangalore (IN); Nithya Vijay, Bangalore (IN)

(73) Assignee: Convida Wireless, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/795,818

(22) Filed: Feb. 20, 2020

(65) Prior Publication Data
US 2020/0196233 A1    Jun. 18, 2020

Related U.S. Application Data

(63) Continuation of application No. 14/867,359, filed on Sep. 28, 2015, now Pat. No. 10,602,441.
(Continued)

(51) Int. Cl.
*H04W 52/02*     (2009.01)
*H04W 4/70*     (2018.01)
(Continued)

(52) U.S. Cl.
CPC ......... *H04W 52/0212* (2013.01); *H04W 4/70* (2018.02); *H04W 52/0229* (2013.01);
(Continued)

(58) Field of Classification Search
CPC .............. H04W 52/0212; H04W 4/70; H04W 52/0229; H04W 68/005
See application file for complete search history.

(56) References Cited

U.S. PATENT DOCUMENTS

| | | |
|---|---|---|
| 2007/0298778 A1 | 12/2007 | Chion et al. |
| 2008/0161033 A1 | 7/2008 | Borran et al. |
| | (Continued) | |

FOREIGN PATENT DOCUMENTS

| | | |
|---|---|---|
| EP | 2849506 A1 | 3/2015 |
| EP | 2897421 A1 | 7/2015 |
| | (Continued) | |

OTHER PUBLICATIONS

3rd Generation Partnership Project (3GPP), 3GPP TR23.887, V12.0.0, Technical Specification Group Services and System Aspects; Study on Machine-Type Communications (MTC) and other Mobile Data Applications Communications Enhancements, (Release 12), Dec. 2013, 151 pages.
(Continued)

*Primary Examiner* — Jael M Ulysse
(74) *Attorney, Agent, or Firm* — BakerHostetler

(57) ABSTRACT

The present application is directed to computer-implemented apparatus for controlling a power savings mode characteristic of a device on a network. The apparatus includes a non-transitory memory with instructions for controlling power saving mode characteristic of the device and a processor operably coupled thereto. The processor performs the step of receiving a request to update the characteristics of the device. The processor also performs the step of updating the characteristics of the device based upon the request. The processor further performs the step of sending an acknowledgment that the characteristic has been updated. The application is also directed to a computer-implemented apparatus on a network for supporting buffering and data
(Continued)

handling for a power savings mode of a device on the network.

11 Claims, 17 Drawing Sheets

Related U.S. Application Data

(60) Provisional application No. 62/056,924, filed on Sep. 29, 2014.

(51) Int. Cl.
*H04W 68/00* (2009.01)
*H04W 72/04* (2009.01)

(52) U.S. Cl.
CPC ....... *H04W 68/005* (2013.01); *H04W 72/042* (2013.01); *Y02D 30/70* (2020.08)

(56) References Cited

U.S. PATENT DOCUMENTS

| | | | |
|---|---|---|---|
| 2008/0304434 A1 | 12/2008 | Giaretta et al. | |
| 2009/0059829 A1* | 3/2009 | Bachmann | H04W 68/005 370/311 |
| 2009/0305699 A1 | 12/2009 | Deshpande et al. | |
| 2010/0118790 A1 | 5/2010 | Guo et al. | |
| 2010/0184432 A1 | 7/2010 | Yano et al. | |
| 2010/0222058 A1 | 9/2010 | Pudney et al. | |
| 2011/0116427 A1 | 5/2011 | Chang et al. | |
| 2011/0171987 A1 | 7/2011 | Yin et al. | |
| 2011/0302638 A1* | 12/2011 | Cha | H04L 63/08 726/6 |
| 2012/0015657 A1 | 1/2012 | Comsa et al. | |
| 2012/0094667 A1 | 4/2012 | Nishida et al. | |
| 2012/0115454 A1 | 5/2012 | Liao | |
| 2012/0157093 A1 | 6/2012 | Zhu et al. | |
| 2012/0166617 A1* | 6/2012 | Chang | H04W 76/10 709/224 |
| 2012/0178479 A1* | 7/2012 | Okabe | H04W 8/30 455/458 |
| 2012/0202543 A1 | 8/2012 | Murias et al. | |
| 2012/0214502 A1* | 8/2012 | Qiang | H04W 8/24 455/453 |
| 2012/0238236 A1 | 9/2012 | Liao | |
| 2012/0252481 A1* | 10/2012 | Anpat | H04W 4/70 455/456.1 |
| 2012/0252518 A1* | 10/2012 | Karampatsis | H04W 4/70 455/515 |
| 2012/0264443 A1* | 10/2012 | Ng | H04W 4/70 455/450 |
| 2012/0269117 A1 | 10/2012 | Hu et al. | |
| 2012/0307732 A1 | 12/2012 | Olsson et al. | |
| 2013/0028097 A1* | 1/2013 | Barrett | H04W 60/00 370/241 |
| 2013/0028235 A1* | 1/2013 | Barrett | H04W 60/04 370/331 |
| 2013/0136047 A1 | 5/2013 | Zhang et al. | |
| 2013/0157661 A1 | 6/2013 | Bhaskaran et al. | |
| 2013/0165101 A1 | 6/2013 | Han et al. | |
| 2013/0235773 A1 | 9/2013 | Wang et al. | |
| 2013/0238917 A1* | 9/2013 | Zhong | H04W 52/0235 713/320 |
| 2013/0242754 A1 | 9/2013 | Shaikh et al. | |
| 2013/0265922 A1 | 10/2013 | Chakravarthy et al. | |
| 2013/0301501 A1 | 11/2013 | Olvera-Hernandez et al. | |
| 2013/0322302 A1 | 12/2013 | Gholmieh et al. | |
| 2014/0018085 A1 | 1/2014 | Young et al. | |
| 2014/0129672 A1 | 5/2014 | Singh | |
| 2014/0194150 A1 | 7/2014 | Wang et al. | |
| 2014/0204931 A1 | 7/2014 | Jain | |
| 2014/0221002 A1 | 8/2014 | Kahn | |
| 2014/0289403 A1* | 9/2014 | Jin | H04L 67/142 709/224 |
| 2015/0043403 A1* | 2/2015 | Martinez Tarradell | H04W 72/082 370/311 |
| 2015/0139054 A1 | 5/2015 | Wu et al. | |
| 2016/0007316 A1* | 1/2016 | Vaidya | H04W 64/003 370/312 |
| 2016/0142860 A1 | 5/2016 | Kim et al. | |

FOREIGN PATENT DOCUMENTS

| | | |
|---|---|---|
| JP | 2012-169969 A | 9/2012 |
| KR | 10-2012-0063426 A | 6/2012 |
| KR | 10-2013-0042014 A | 4/2013 |
| WO | 2007/133034 A2 | 11/2007 |
| WO | 2012/025825 A2 | 3/2012 |
| WO | 2012/135514 A1 | 10/2012 |
| WO | 2013/080764 A1 | 6/2013 |
| WO | 2013/177992 A1 | 12/2013 |
| WO | 2014/032562 A1 | 3/2014 |
| WO | 2014/040463 A1 | 3/2014 |
| WO | 2014/061911 A1 | 4/2014 |

OTHER PUBLICATIONS

3rd Generation Partnership Project; (3GPP) TR 22.853 V13.0.0, 3rd Generation Partnership Project; Technical Specification Group Services and System Aspects; Study on Service Exposure and Enablement Support (SEES) Requirements (Release 13), Jun. 2014, 24 pages.

3rd Generation Partnership Project; (3GPP) TR 23.862 V12.0.0, 3rd Generation Partnership Project; Technical Specification Group Services and System Aspects; Evolved Packet Core (EPC) Enhancements to Support Interworking With Data Application Providers; Stage 2 (Release 12), Dec. 2013, 23 pages.

3rd Generation Partnership Project; (3GPP) TS 22.368 V13.0.0, 3rd Generation Partnership Project; Technical Specification Group Services and System Aspects; Service Requirements for Machine-Type Communications (MTC); Stage 1 (Release 13), Jun. 2014, 26 pages.

3rd Generation Partnership Project; (3GPP) TS 23.040 V12.2.0, 3rd Generation Partnership Project; Technical Specification Group Core Network and Terminals; Technical Realization of the Short Message Service (SMS) (Release 12), Dec. 2013, 209 pages.

3rd Generation Partnership Project; (3GPP) TS 23.060 V13.0.0, 3rd Generation Partnership Project; Technical Specification Group Services and System Aspects; General Packet Radio Service (GPRS); Service Description; Stage 2 (Release 13), Sep. 2014, 350 pages.

3rd Generation Partnership Project; (3GPP) TS 23.140 V6.16.0, 3rd Generation Partnership Project; Technical Specification Group Core Network and Terminals; Multimedia Messaging Service (MMS); Functional Description; Stage 2 (Release 6), Mar. 2009, 223 pages.

3rd Generation Partnership Project; (3GPP) TS 23.203 V13.1.0, 3rd Generation Partnership Project; Technical Specification Group Services and System Aspects; Policy and Charging Control Architecture (Release 13), Sep. 2014, 223 pages.

3rd Generation Partnership Project; (3GPP) TS 23.335 V11.0.0, 3rd Generation Partnership Project; Technical Specification Group Core Network and Terminals; User Data Convergence (UDC); Technical Realization and Information Flows; Stage 2 (Release 11), Sep. 2012, 39 pages.

3rd Generation Partnership Project; (3GPP) TS 23.401 V13.0.0, 3rd Generation Partnership Project; Technical Specification Group Services and System Aspects; General Packet Radio Service (GPRS) Enhancements for Evolved Universal Terrestrial Radio Access Network (E-UTRAN) Access (Release 13), Sep. 2014, 308 pages.

3rd Generation Partnership Project; (3GPP) TS 23.682 V12.2.0, "3rd Generation Partnership Project; Technical Specification Group Services and System Aspects; Architecture Enhancements to Facilitate Communications With Packet Data Networks and Applications (Release 12)", Jun. 2014, 32 pages.

3rd Generation Partnership Project; (3GPP) TS 24.301 V12.6.0, "3rd Generation Partnership Project; Technical Specification Group

(56) References Cited

OTHER PUBLICATIONS

Core Network and Terminals; Non-Access-Stratum (NAS) Protocol for Evolved Packet System (EPS); Stage 3 (Release 12)", Sep. 2014, 370 pages.
3rd Generation Partnership Project; (3GPP) TS 27.007 V12.6.0, "3rd Generation Partnership Project; Technical Specification Group Core Network and Terminals; AT Command Set for User Equipment (UE) (Release 12)" Sep. 2014, 314 pages.
3rd Generation Partnership Project; (3GPP) TS 29.212 V12.6.0, "3rd Generation Partnership Project; Technical Specification Group Core Network and Terminals; Policy and Charging Control (PCC); Reference Points (Release 12)", Sep. 2014, 228 pages.
3rd Generation Partnership Project; (3GPP) TS 29.213 V12.5.0, 3rd Generation Partnership Project; Technical Specification Group Core Network and Terminals; Policy and Charging Control signalling flows and Quality of Service (QoS) Parameter Mapping (Release 12), Sep. 2014, 207 pages.
3rd Generation Partnership Project; (3GPP) TS 29.214 V12.5.0, 3rd Generation Partnership Project; Technical Specification Group Core Network and Terminals; Policy and Charging Control over Rx Reference Point (Release 12), Sep. 2014, 61 pages.
3rd Generation Partnership Project; (3GPP) TS 29.272 V12.5.0, 3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 12), Jun. 2014, 133 pages.
3rd Generation Partnership Project; (3GPP) TS 32.270 V12.0.0, 3rd Generation Partnership Project; Technical Specification Group Services and System Aspects; Telecommunication Management; Charging Management; Multimedia Messaging Service (MMS) Charging (Release 12), Sep. 2014, 64 pages.
3rd Generation Partnership Project; (3GPP) TS 32.296 V12.2.0, 3rd Generation Partnership Project; Technical Specification Group Services and System Aspects; Telecommunication Management; Charging Management; Online Charging System (OCS): Applications and Interfaces (Release 12), Sep. 2014, 94 pages.
3rd Generation Partnership Project; (3GPP) TS 36.331 V12.3.0, 3rd Generation Partnership Project; Technical Specification Group Radio Access Network; Evolved Universal Terrestrial Radio Access (E-UTRA); Radio Resource Control (RRC); Protocol Specification (Release 12), Sep. 2014, 378 pages.
3rd Generation Partnership Project; (3GPP) TS 36.413 V12.3.0, 3rd Generation Partnership Project; Technical Specification Group Radio Access Network; Evolved Universal Terrestrial Radio Access Network (E-UTRAN); S1 Application Protocol (S1AP) (Release 12), Sep. 2014, 290 pages.
English Translation of JP Office Action dated Jul. 17, 2018 for JP Application No. 2017516857.
International Application No. PCT/US2015/052594: International Search Report and Written Opinion dated Jan. 29, 2016.
Open Mobile Alliance (OMA) "Lightweight Machine to Machine Technical Specification", Draft Version 1.0, Feb. 6, 2013, 53 pages.
Open Mobile Alliance (OMA) OMA Management Interface to M2M Requirements, Draft Version 1.0.
Resnick, P., "Internet Message Format", RFC#2822, Network Working Group, Apr. 2001, 48 pages.
Shelby et al, "The Constrained Application Protocol (CoAP)", RFC# 7252, Internet Engineering Task Force (IETF), Jun. 2014, 113 pages.

\* cited by examiner

SERVICE CAPABILITY SERVER / EPC COORDINATION FOR POWER SAVINGS MODE AND PAGING

CROSS-REFERENCE TO RELATED APPLICATIONS

This application is a continuation of U.S. patent application Ser. No. 14/867,359 filed Sep. 28, 2015 which claims priority to U.S. Provisional Application No. 62/056,924, filed Sep. 29, 2014, the disclosure of which is incorporated herein by reference in its entirety.

BACKGROUND

The Third Generation Partnership Project (3GPP) unites a number of telecommunications standard development organizations and provides their members with an environment in which to develop specifications for cellular telecommunications network technologies, including radio access, the core transport network, and service capabilities. 3GPP specifications also provide hooks for non-radio access to the core network, and for interworking with other networks.

More recently 3GPP introduced the Power Savings Mode (PSM) feature. PSM is a new user equipment (UE) state where the UE can stop listening for paging, stop performing idle mode procedures, etc. When the UE is in this state, it may not be reachable for mobile terminated (MT) communications. While the UE may certainly benefit from energy savings, other entities, such as for example, a Service Capability Server (SCS), lack control or awareness as to whether the UE is using the PSM feature. Likewise, the UE is unaware of when the SCS will need to reach the UE. Thus, the UE may not know the best time to invoke PSM.

The PSM feature presently allows the UE to ask the Mobile Management Entity (MME) to go into PSM mode for a predetermined amount of time. The MME has authority over whether the UE's request should be granted. Thus, a SCS cannot prevent a UE from entering a PSM state. The SCS also cannot control the instant the UE enters the PSM state, as well as the duration of the PSM state. Separately, the SCS is not apprised as to when the UE moves into and out of a PSM state. Without this information, the SCS cannot efficiently initiate and/or schedule its MT communication with the UE. Since many of the PSM capable devices are low power/low cost devices, it is important to avoid retransmission of data to these devices to avoid higher power consumption, wastage of network resources, and patchy communication with the device.

Further, the PSM feature requires that the UE request a value for 'Periodic Tracking Area Update (TAU)' and the 'Active time'. The requested times depend upon when the UE anticipates that it will need to be available for MT data. While the MME decides the final value of these timers, the MME cannot initiate the request to provide an active timer for the UE.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for facilitating control and coordination of user equipment (UE).

In one aspect of the application, there is described a computer-implemented apparatus controlling power savings mode characteristics of a device on a network. The apparatus includes a non-transitory memory having instructions stored for controlling power savings mode characteristics. The non-transitory memory is operably coupled to a processor for executing the instructions. The instructions include receiving a request to update the characteristics of the device on the network. The instructions also include updating the characteristic of the device based upon the request. The instructions further include sending an acknowledgement that the characteristic has been updated.

In another aspect of the application, there is described a computer-implemented apparatus controlling power savings mode characteristics of a device on a network. The apparatus includes a non-transitory memory having instructions stored for controlling power savings mode characteristics. The non-transitory memory is operably coupled to a processor for executing the instructions. The instructions include receiving a tracking area update or an attach request from the device on the network. The instructions also include sending a device availability notification request to a core network interworking function or a service capability server. The instructions also include receiving a device availability notification answer from the interworking function or the service capability server.

In yet another aspect of the application, there is described a computer-implemented apparatus for supporting buffering and data handling for a power savings mode of a device on the network. The apparatus includes a non-transitory memory having instructions stored thereon. The non-transitory memory is operably coupled to a processor for executing the instructions. The instructions include receiving a downlink data notification from a serving gateway. The instructions also include determining the device is in a power saving mode and that an enhanced data handling flag is enabled. The instructions further include sending a downlink data notification acknowledgment to the serving gateway including the enhanced data handling flag.

In a further aspect of the application, there is described a computer-implemented method for controlling a power savings mode characteristic of a device on a network. The method includes the step of receiving a tracking area update or an attach request from the device on the network. The method also includes a step of sending a device availability notification request to a core network interworking function or a service capability server. The method further includes a step of receiving a device availability notification answer from the core network interworking function or the service capability server. The notification request provides notification information of when the device exits power savings mode.

In a further aspect of the application, there is described a computer-implemented method for controlling a power savings mode characteristic of a device on a network. The method includes the step of receiving a request to update the characteristics of the device on the network. The method also includes a step of updating the characteristic of the device based upon the request. The method also includes a step of sending an acknowledgement that the characteristic has been updated. The method further includes a step of forwarding an insert subscriber data request to a mobile management entity.

In a further aspect of the application, there is described a computer-implemented method for supporting buffering and data handling for a power saving mode of a device on a network. The method includes a step of receiving a downlink data notification from a serving gateway. The method also includes a step of determining the device is in power saving mode and that an enhanced data handling flag is enabled. The method also includes a step of sending a downlink data notification acknowledgment to the serving gateway including the enhanced data handling flag. The method further includes a step of paging the device.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
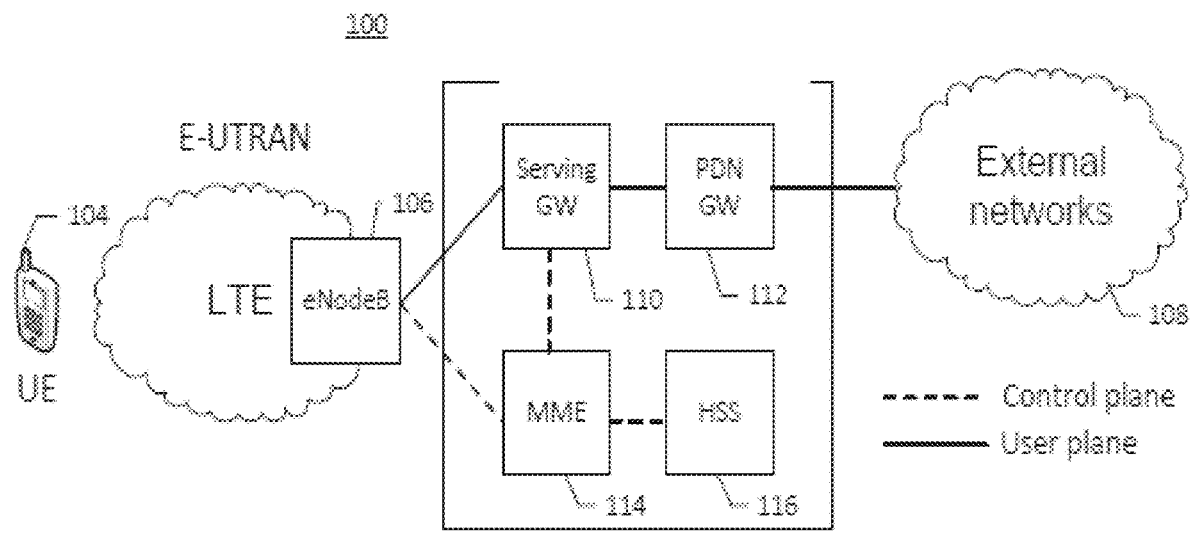
FIG. 1 illustrates a basic architecture a E-UTRAN, evolved packet core and external network(s).

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes techniques for facilitating control and coordination of UEs between a core network (CN) and a service capability server (SCS). In one aspect of the present application, techniques are described whereby UEs are controlled upon entering, remaining within and exiting a power saving mode (PSM). In particular, the present application provides for new protocols between a core network (CN), including a mobility management entity (MME), a MTC Interworking function (MTC-IWF) and a service capability server (SCS). In one embodiment, the SCS can enable and/or disable PSM features for individual UEs to align UE reachability with machine mobile terminated (MT) data periodicity. In another embodiment, the SCS may subscribe to a MME to coordinate mobile terminated (MT) data on every tracking area update (TAU) and attach request. The SCS may also influence the decision of the "Active Timer" and "Periodic TAU timer" values which the MME sends to the UE in order for the UE's active time to be aligned with MT data. In another embodiment, the SCS may enable and/or disable enhanced buffering of data at a serving gateway (SGW) and also specially handle data at the eNodeB to ensure delivery of data packets to UEs in PSM or that are low power UEs. By so doing, application level retransmissions may be reduced and/or eliminated.

Another aspect of the application is directed to novel procedures for pre-triggering PSM UEs. For instance, a core network interworking function may facilitate transmitting a request message from a SCS to a MME. A machine type communication interworking function (MTC-IWF) is one type of core network interworking function that may facilitate transmitting a request message from a SCS to a MME or HSS. A service capability exposure function (SCEF) is another type of core network interworking function that may facilitate transmitting a request message from a SCS to an MME or HSS. For example, the SCS may notify the UE via a Device-Availability-Notification request to control a UE that is in an idle mode. Moreover, the SCS may receive an answer via a Device-Availability-Notification answer.

According to even another aspect of the present application, there is described a core network node (MME) with the capability of initiating a PSM in a UE. In one embodiment, the UE gives more control to the network by making it aware of its PSM capability and thereby allowing the network to perform network initiated PSM procedures. In another embodiment, the CN may enable PSM for the UE to provide a low power consumption preference in the UE Assistance Information.

In yet a further aspect of the present application, a procedure is described for optimizing paging for low mobility devices. By so doing, the UE may consume less battery power since AS functionalities are turned off during PSM. In one embodiment, the MME may be configured to provide a specific subset of tracking area (TA) List to each UE based on its mobility parameters in lieu of providing an entire TA List served by the MME to all connecting UEs. In another embodiment, the CN may support paging optimization for stationary/low mobility UEs, by paging the last updated tracking area in lieu of paging all tracking areas in the tracking area list.

Table 1 below provides a list of generally used acronyms throughout the application.

TABLE 1

| Acronym | Description |
|---|---|
| 3GPP | 3rd Generation Partnership Project |
| AVP | Attribute-Value Pair |
| AT | Attention |
| CN | Core Network |
| DL | Down Link |
| ECGI | E-UTRAN Cell Global ID |
| E-UTRAN | Evolved Universal Terrestrial Radio Access Network |
| EMM | EPS Mobility Management |
| eNB | Evolved Node B |
| EPC | Evolved Packet Core |
| EPS | Evolved Packet System |
| ETSI | European Telecommunications Standards Institute |
| FQDN | Fully Qualified Domain Name |
| HLR | Home Location Register |
| HSS | Home Subscriber Server |
| IE | Information Element |
| IMSI | International Mobile Subscriber Identity |
| IP | Internet Protocol |
| LS | Liaison Statement |
| LTE | Long Term Evolution |
| LWM2M | Lightweight Machine to Machine |
| M2M | Machine to Machine |
| M2MGW | M2M Gateway |
| MME | Mobility Management Entity |
| MS | Mobile Station |
| MSISDN | Mobile Subscriber Integrated Services Digital Network-Number |
| MT | Mobile Termination/Mobile Terminated |
| MT-SMS | Mobile Terminated SMS |
| MTC | Machine Type Communication |
| MTC-IWF | Machine Type Communications Inter-Working Function |
| NAS | Non-Access Stratum |
| PDN | Packet Data Network |
| PLMN | Public Land Mobile Network |
| PSM | Power Saving Mode |
| RAT | Radio Access Technology |
| RRC | Radio Resource Control |
| SGW | Serving Gateway |
| SC | Service Center |
| SCS | Services Capability Server |
| SDO | Standards Developing Organizations |
| SEES | Service Exposure and Enablement Support |
| SMS | Short Message Service |
| TA | Tracking Area |
| TAU | Tracking Area Update |
| TS | Technical Specification |
| UDC | User Data Convergence |
| UDR | User Data Repository |
| UE | User Equipment |
| UL | Up Link |
| ULA | Update-Location-Answer |
| USSD | Unstructured Supplementary Service Data |

The latest evolution of the 3GPP core network architecture for wireless communications is referred to as the Evolved Packet Core (EPC). EPC was first introduced by 3GPP in Release 8 of the standard. It was designed to have a "flat architecture" in order to handle data traffic efficiently from a performance and cost perspective, and few network nodes are involved in the handling of traffic. Protocol conversion is also generally avoided. It was also decided to separate the user data (also known as the "user plane") from the signaling (also known as the "control plane"), which enables network operators to dimension and adapt their networks easily.

Machine type communications (MTC)s involve communications between different entities that do not necessarily involve human interaction. In particular, M2M devices may be characterized as having low mobility. That is, the M2M device might not move, move infrequently, or move only within a certain region. One example may be a M2M device installed in a street light. M2M devices may also be characterized as having infrequent mobile terminated communication. Specifically, they may infrequently need to receive data. For example, a smart meter may frequently collect data and send it to an SCS, but the SCS may infrequently initiate communication to the smart meter. M2M devices may further be characterized as having time-controlled communications, or asymmetric communications. Some M2M devices may send or receive data at very predictable times, e.g., an environmental sensor may be programmed to send sensor readings at defined times of the day. Conversely, other M2M devices may require a very short latency, e.g., a home security alarm system.

MTC devices may utilize the services of the SCS to communicate with external MTC applications. The 3GPP system provides transport for M2M device communication. Additionally, the 3GPP system may also provide other value added services for machine type communication. Different architectural models in 3GPP systems are based on the relationship of the MTC service provider (SCS) and the 3GPP network operator. A MTC-IWF is introduced in 3GPP system to enable the communication of 3GPP networks with one or more SCSs. The MTC-IWF could be a standalone entity or a functional entity of another network element. The MTC-IWF hides the internal PLMN topology and relays or translates information sent over the diameter based Tsp reference point to invoke specific functionality in the PLMN.

According to an embodiment, FIG. 1 illustrates a basic architecture diagram 100 including a User Equipment (UE) 104, e.g., a mobile phone or other wireless device, connected to the EPC 102 over E-UTRAN (LTE access network). The Evolved NodeB (eNodeB) 106 is the base station for LTE radio. The EPC includes four network elements: (i) the Serving Gateway (Serving GW) 110, (ii) the Packet Data Network Gateway (PDN GW) 112, (iii) the MME 114 and (iv) the HSS 116. The EPC may be connected to external networks 108. The HSS (for Home Subscriber Server) 116 is a database that contains user-related and subscriber-related information. It also provides support functions in mobility management, call and session setup, user authentication and access authorization.

The gateways (Serving GW 110 and PDN GW 112) deal with the user plane. They transport IP data traffic between the User Equipment (UE) and the external networks. The Serving GW 110 is the point of interconnect between the radio-side and the EPC. As its name indicates, this gateway serves the UE by routing incoming and outgoing IP packets. It is the anchor point for intra-LTE mobility, i.e., in case of handover between eNodeBs and between LTE and other 3GPP accesses. It is logically connected to the other gateway, the PDN GW.

The PDN GW 112 is the point of interconnect between the EPC and external IP networks, such as the Internet. These networks are called PDN (Packet Data Network), hence the name. The PDN GW routes packets to and from the PDNs. The PDN GW also performs various functions such as IP address/IP prefix allocation or policy control and charging. 3GPP specifies these gateways independently but in practice they may be combined in a single "box" by network vendors.

The MME (for Mobility Management Entity) 114 deals with the control plane. It handles the signaling related to mobility and security for E-UTRAN access. The MME is responsible for the tracking and the paging of UEs in idle-mode. It is also the termination point of the Non-Access Stratum (NAS).

As shown in FIG. 1, a UE 104 can reach the EPC 102 using E-UTRAN, however this is not the only access technology supported. 3GPP specifies support of multiple access technologies and also the handover between these accesses. The idea is to bring convergence using a unique core network providing various IP-based services over multiple access technologies. Existing 3GPP radio access networks are supported. 3GPP specifications define how interworking is achieved between an E-UTRAN (LTE and LTE-Advanced), GERAN (radio access network of GSM/GPRS) and UTRAN (radio access network of UMTS-based technologies WCDMA and HSPA).

The architecture also allows non-3GPP technologies to interconnect the UE and the EPC. Non-3GPP means that these accesses were not specified in 3GPP. These technologies include, for example, WiMAX, cdma2000®, WLAN or fixed networks. Non-3GPP accesses can be split into two categories: the "trusted" ones and the "untrusted". Trusted non-3GPP accesses can interact directly with the EPC. Untrusted non-3GPP accesses interwork with the EPC via a network entity called the ePDG (for Evolved Packet Data Gateway) (not shown). The main role of the ePDG is to provide security mechanisms such as IPsec tunneling of connections with the UE over an untrusted non-3GPP access. 3GPP does not specify which non-3GPP technologies should be considered trusted or untrusted. This decision is made by the operator.

The 3GPP network architecture illustrated in FIG. 1 was originally designed to enable communication between devices that are traditionally operated by humans. For example, the 3GPP network is well suited for providing a smart phone with access to a packet switched network such as the internet and a circuit switched network such as a Global System for Mobile Communications (GSM) network. The 3GPP network was not originally designed in a way that is optimized for handling so called machine-to-machine (M2M) communications, also referred to as machine type communications (MTC), in which machines, or devices, communicate with each other over the network, such as communications involving smart metering, home automation, eHealth, consumer products, fleet management, etc.

In Release 11 (R11) of the 3GPP specifications, 3GPP enhanced the interworking capabilities of the UMTS core network for machine type communications/machine-to-machine communications. Interworking refers to a server, or application, interfacing to the core network for the purposes of exchanging information, controlling devices, or monitoring devices, or communicating with devices.

Figure 2:
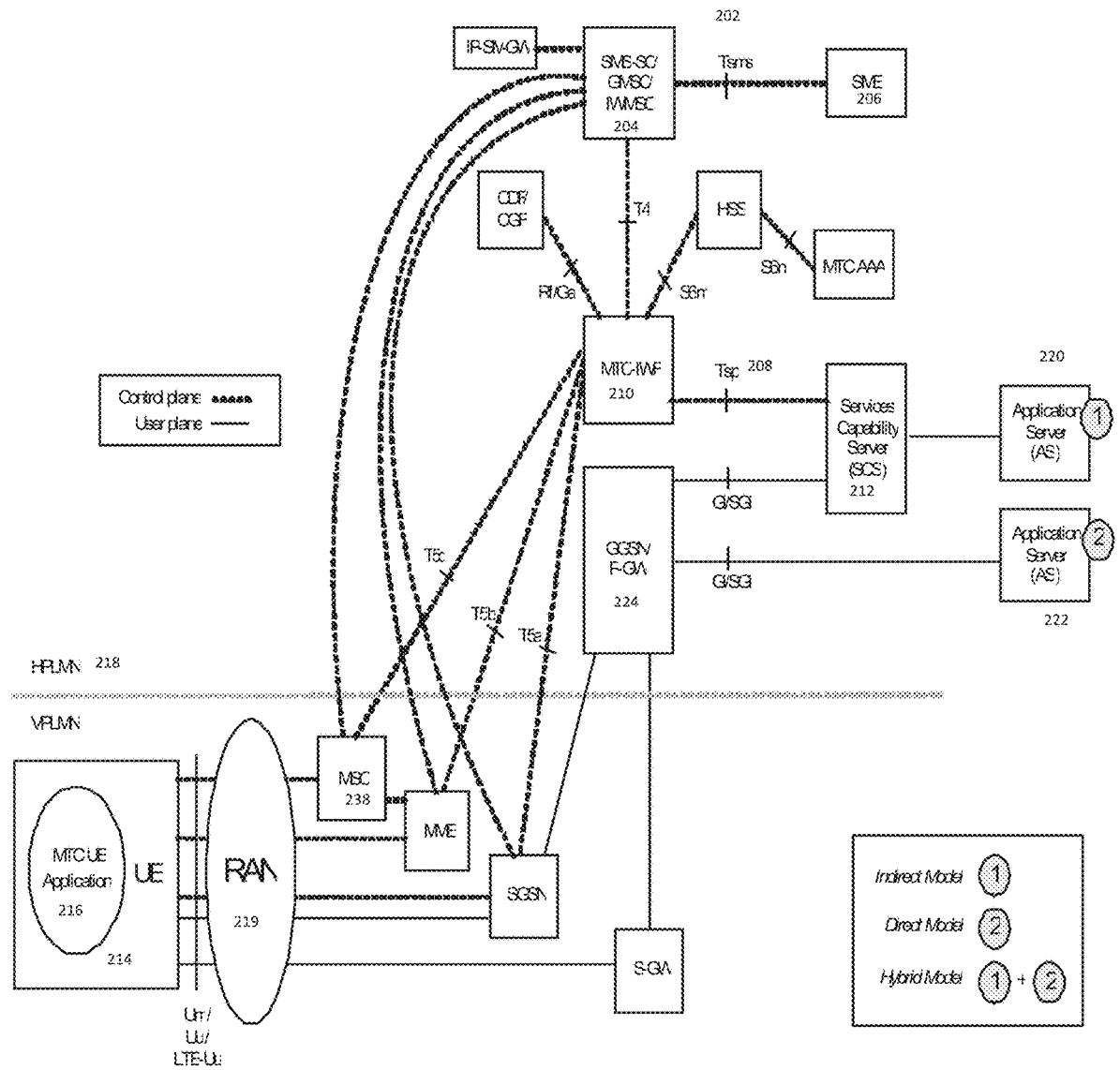
FIG. 2 illustrates 3GPP core networking architecture.

In another embodiment, FIG. 2 illustrates a MTC architecture that is presented by 3GPP in TS 23.682 V11.5.0. As illustrated in FIG. 2, a service capability server (SCS) 212 may provide services to the core network, devices, and applications. The SCS may also be called a M2M Server, MTC Server, a Service Capability Layer, or a Common Services Entity (CSE). An SCS 212 may be controlled by the operator of the home public land mobile network (HPLMN) or by an MTC service provider. An SCS may be deployed inside or outside the operator domain. If an SCS is deployed inside the operator domain, the SCS may be an internal network function and may be controlled by the operator. If an SCS is deployed outside the operator domain, the SCS may be controlled by a MTC service provider.

An SCS may communicate with a machine type communication (MTC) interworking function (MTC-IWF) 210 via a Tsp reference point, i.e., interface. The Tsp reference point is an example of an interface that is used for interworking with the core network.

In another embodiment, as illustrated in FIG. 2, the reference point, i.e., interface, Tsms 202 may connect a short message service (SMS) service center (SMS-SC) 204 to a short message entity (SME) 206. The Tsms reference point is another example of an interface that is used for interworking with the core network. The SMS-SC 204 communicates with the MTC-IWF over a T4 reference point.

The SCS 212 may be an entity that connects to a 3GPP network to communicate with user equipment MTC (UE MTC) application 216, the MTC-IWF 210 in the HPLMN, e.g., as defined by the boundary 218, or a SMS-SC 204 for device triggering. The SCS 212 may offer capabilities for use by one or more application server MTC (AS MTC) applications.

A UE may communicate through the public land mobile network (PLMN), which includes radio access network (RAN) 219, with SCS(s) and/or other MTC UE(s). A MTC UE 214 may host one or more MTC applications 216. The MTC applications may also be hosted on one or more application servers (AS)s 220/222. The MTC application 216 may be a MTC communication endpoint that may interact with SCSs 212, AS MTC applications, or other UE MTC applications.

An AS 220/222 may also host one or more MTC applications. An AS may interface with SCS(s) 212 or a GGSN/P-GW 224. The MTC applications on an AS may interact with SCSs, UE MTC applications, or other MTC applications.

The MTC inter working function (MTC-IWF) 210 may hide the internal PLMN topology from the SCS 212. The MTC-IWF may relay and/or translate signaling protocols used between itself and the SCS, e.g., over the Tsp reference point 208, to support MTC functionality, e.g., MTC UE triggering, in the PLMN. For example, the SCS may request that the MTC-IWF send a trigger to a MTC device. The MTC-IWF may deliver the MTC trigger to the MTC device 214 via SMS. The MTC device 216, based on the trigger, may respond to the SCS 212. The MTC device 216 may, for example, respond with a sensor reading. When the MTC device 216 responds to the SCS 212, the MTC device may use a packet data network (PDN)/packet data protocol (PDP) connection to communicate with the SCS 212. The MTC device may connect with the SCS using an IP connection.

The MTC-IWF 210 may authorize an SCS 212, before the SCS may establish communication with a 3GPP network. For example, when the SCS 212 makes a trigger request on the Tsp reference point, the MTC-IWF 210 may check whether the SCS is authorized to send the trigger request and that the SCS has not exceeded its quota or rate of trigger submissions.

As further shown in FIG. 2, a mobile switching center (MSC) 238 is the primary service delivery node for GSM/CDMA, responsible for routing voice calls and SMS as well as other services (such as conference calls, FAX and circuit switched data). The MSC sets up and releases the end-to-end connection, handles mobility and hand-over requirements during the call and takes care of charging and real time pre-paid account monitoring.

LWM2M Architecture

Figure 3A:
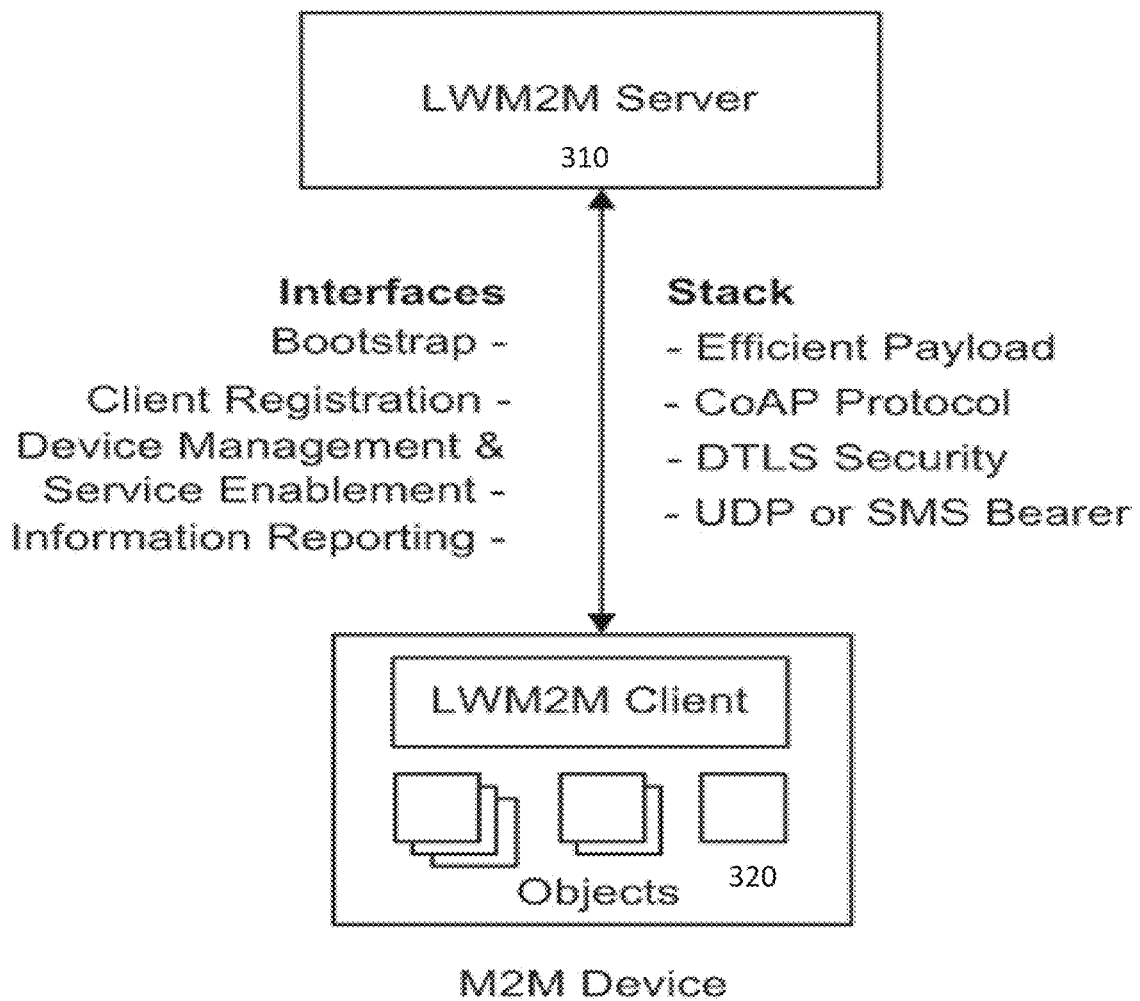
FIG. 3A illustrates an interface between a LWM2M server and a LWM2M client according to an embodiment.

Lightweight machine to machine (LWM2M) protocol was developed by the Open Mobile Alliance (OMA) standards body to enable management of resource constrained, M2M/IoT devices. The purpose of this protocol was to provide a lightweight architecture that minimizes protocol overhead by using an efficient transport protocol such as CoAP (Constrained Application Protocol) and minimizing message and data model sizes. FIG. 3A shows the OMA LWM2M architecture in which a LWM2M server 310 communicates to a LWM2M client 320 through various defined interfaces using a minimal, efficient stack. The LWM2M client 320 runs on a M2M/IoT device and implements LWM2M objects that could be used to perform management functions. These objects are LWM2M data models that incorporate resources hosted on the devices that can be exercised by a LWM2M server. Among some of the functions that can be managed are obtaining device information such as software version, battery level, and available memory as well as providing connectivity monitoring such as cellular link quality and radio signal strength.

Figure 3B:
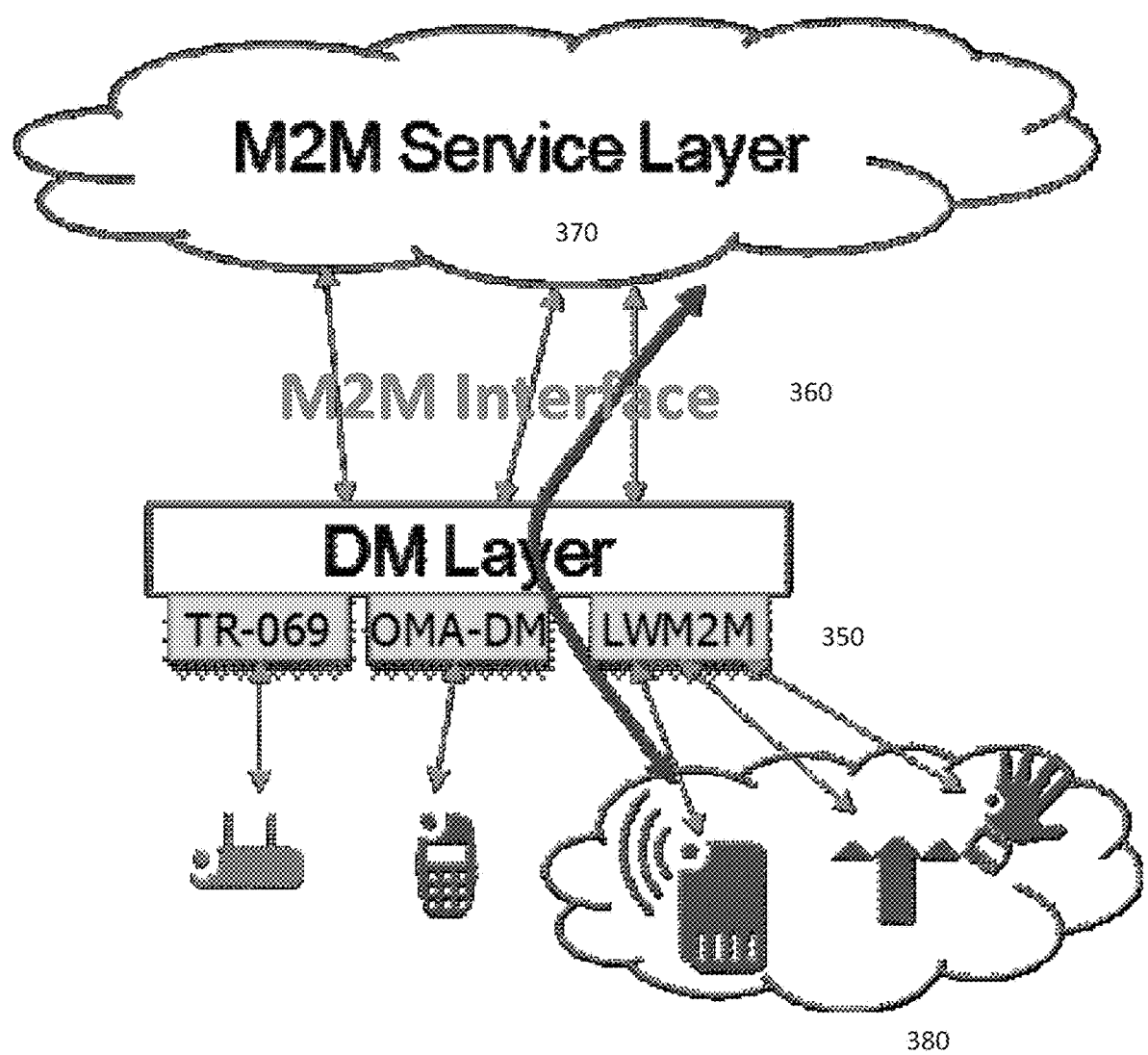
FIG. 3B illustrates an interface between a M2M service layer and a DM layer according to an embodiment.

The LWM2M architecture 350 may be incorporated into a M2M service layer architecture 370 through the M2M interface 360 as illustrated in FIG. 3B. As a result of this integration, device management of M2M/IoT devices 380 can be realized easily within the service layer domain. An M2M application registered to the service layer can then initiate management of devices to a management server such as the LWM2M Server, which will execute the management commands on the devices. As a result of this integration, key metrics such as link quality and battery level could be retrieved from the device and used as part of an overall power conservation strategy to manage the device.

General Architecture

Figure 4A:
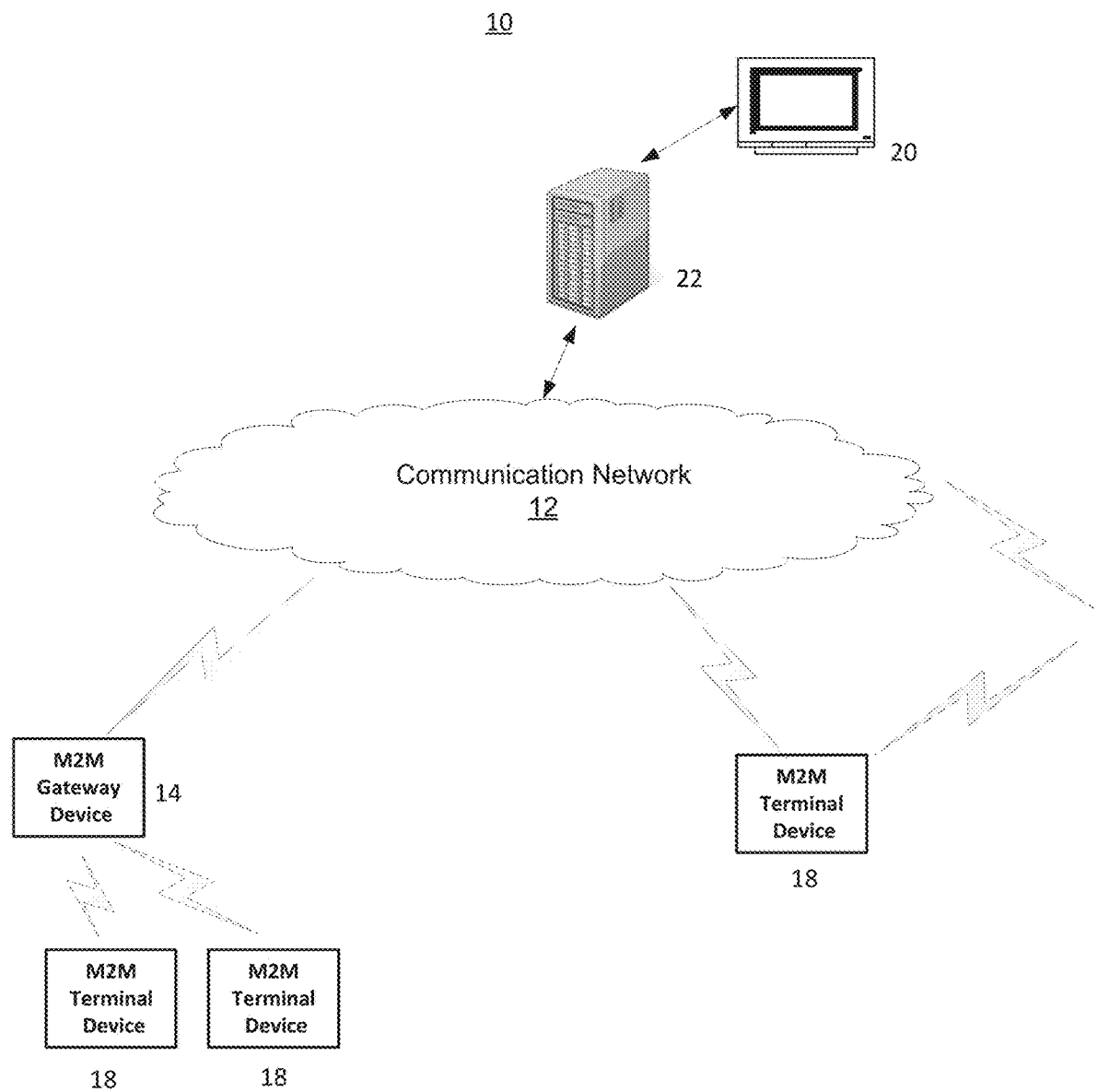
FIG. 4A illustrates an embodiment of a machine-to-machine (M2M) or IoT communication system.

FIG. 4A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 4A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 4A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a SCS with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 4B:
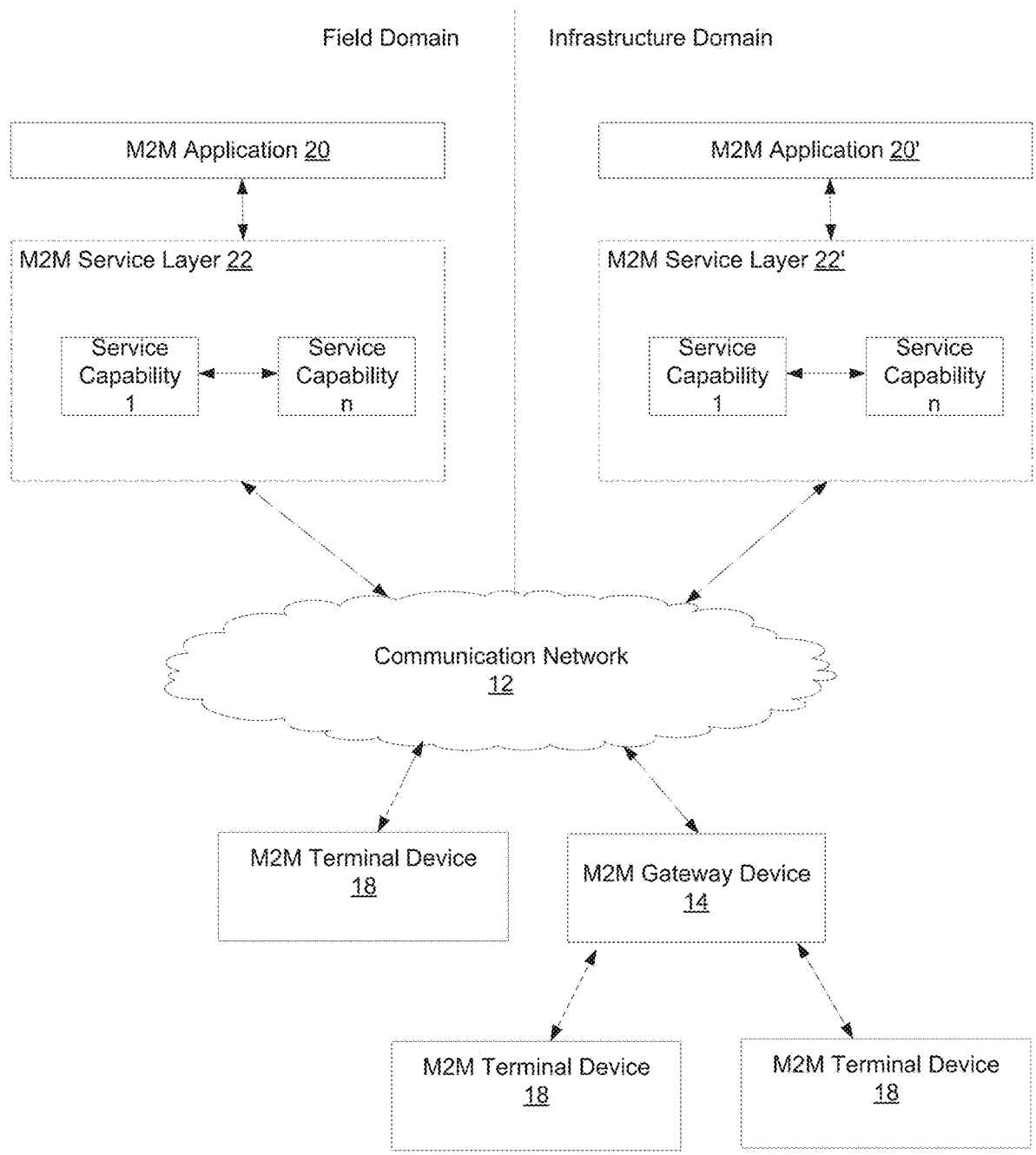
FIG. 4B illustrates an embodiment of the application of a M2M service platform.

Referring to FIG. 4B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 4B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, SCSs and MMES as discussed in this application and illustrated in the figures.

The method of controlling and coordinating UE's PSM mode as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of controlling and coordinating UEs PSM mode. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node. Further, the method of reserving a Track as described in the present application can be implemented as part of an M2M network that uses a Service Oriented Architecture (SOA) and/or a resource-oriented architecture (ROA) to access services such as the reserving a Track according to the present application.

Figure 4C:
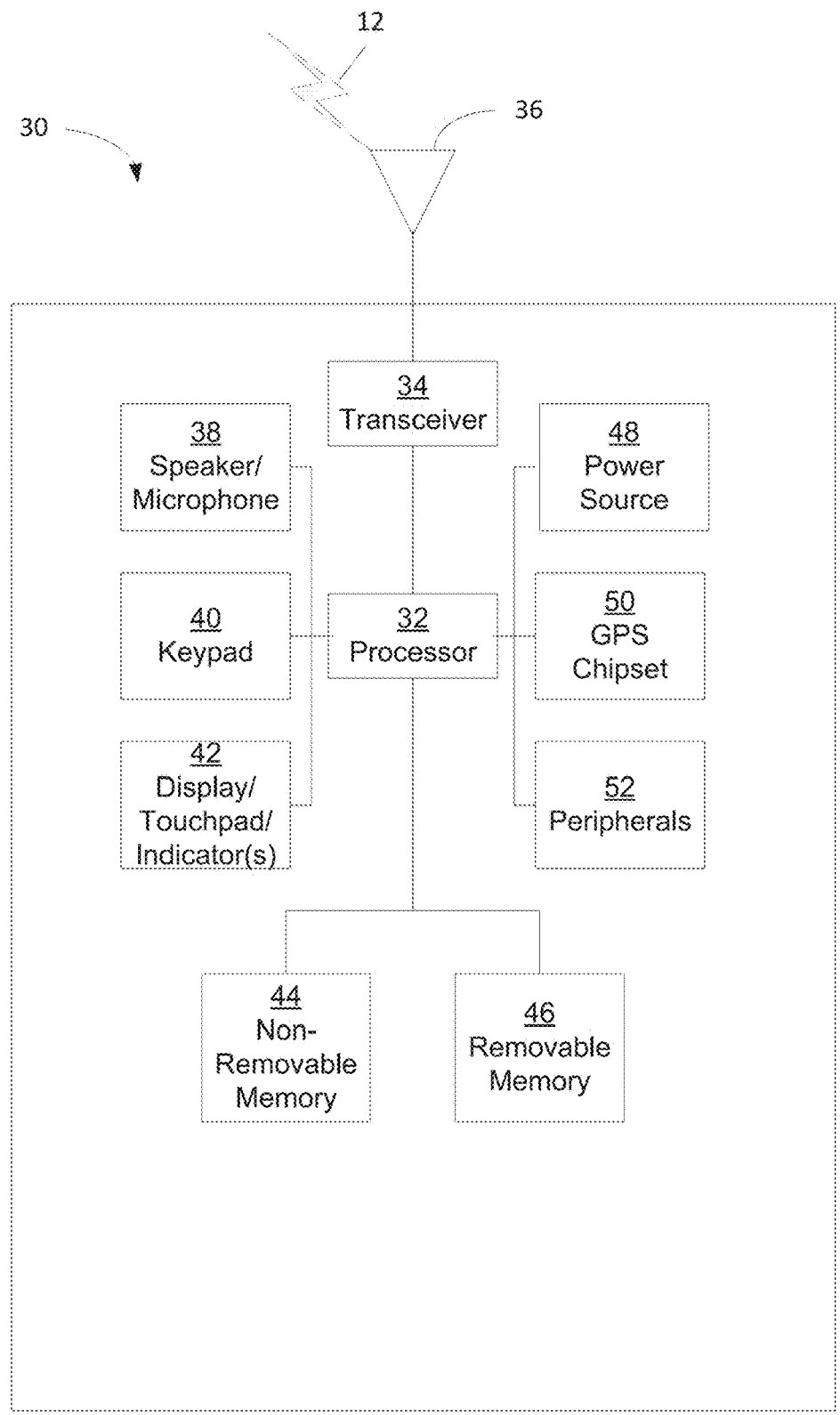
FIG. 4C illustrates an embodiment of the application of a system diagram of an example M2M device.

FIG. 4C is a system diagram of an example M2M device 30, such as a M2M terminal device 18 or an M2M gateway device 14 for example. As shown in FIG. 4C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including fore example LLN devices, Backbone routers and PCEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 4C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 4C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4D:
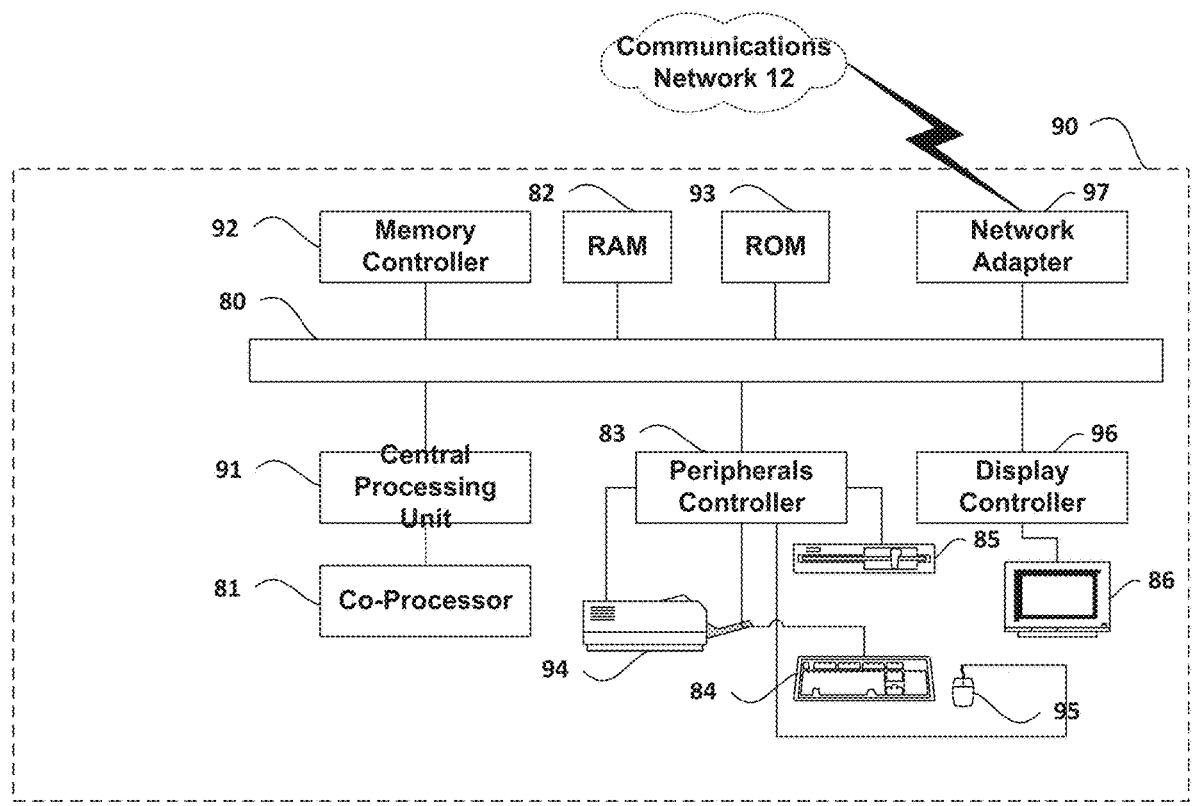
FIG. 4D illustrates an embodiment of the application of a block diagram of an exemplary computing system.

FIG. 4D is a block diagram of an exemplary computing system 90 on which, for example, the M2M service platform 22 of FIG. 4A and FIG. 4B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 4A and FIG. 4B.

SCS Coordination of PSM

According to an aspect of the present application, the goal of the Power Saving Mode (PSM) feature is to reduce power consumption at the UE. A UE under PSM mode is not reachable for MT communication, however, the UE remains registered with the network and there is no need to re-attach or re-establish packet data network (PDN) connections. The PSM feature introduces a new timer called "Active Time" which indicates the time during which the UE remains reachable before going into to PSM mode. The UE starts an active timer when it attaches to the network or performs a tracking area update (TAU). When the active timer expires, the UE deactivates its Access Stratum functions and enters PSM. In PSM, due to deactivation of Access Stratum functions, the UE stops all idle mode procedures, but continues to run non-Access Stratum (NAS) timers that may apply, e.g., the periodic TAU timer.

In one embodiment, the SCS may influence the selection of the "Active Timer" and "Periodic TAU timer" values that the MME sends to the UE. SCS may send a new "MT data Delay Tolerance" value to the MME (via the MTC-IWF). The "MT data Delay Tolerance" value indicates how much delay is acceptable for MT data. Preferably, the Delay tolerance should be more than (periodic TAU timer–active timer).

In another embodiment, the SCS may also send a new "Periodicity of MT data" value to the MME. This may be used by the MME to calculate values of the Active timer and align UE IDLE mode with MT data. If the MT data transmissions are aligned with UE Active Timer and Periodic TAU Timer, then the number of device triggers required to send periodic MT data to the UE may be reduced. This can save a lot of overhead in the network.

In a further embodiment, the SCS may subscribe to MME to coordinate with the SCS on every TAU and attach request. The SCS can set/reset a new "PSM sync flag" to enable/disable notifications on every TAU and attach request. It is envisaged that when a SCS has knowledge of MT data transmission periodicity, the SCS may send an indication to the core network to provide the periodicity characteristics. For example, the SCS will have this information if the sensor readings will only be requested by the SCS at certain times of the day. The periodicity characteristics include the delay tolerance of MT data and periodicity of MT data. This information is forwarded to MME by MTC-IWF, which stores the SCS addresses, the periodicity of MT data, the delay tolerance, PSM sync flag, and a PSM Disable Flag in the UE context. If there are multiple SCSs providing different values, then all these values may be stored in the UE context and the MME may choose PSM values such that the UE is 'active' whenever one or more SCSs need to reach the UE.

MME can now use the periodicity characteristics from the SCS and "Active Timer" and "Periodic TAU timer" values from the UE to choose appropriate "Active Timer" and "Periodic TAU timer" values. The values will be chosen such that they are well aligned with MT data transmission. If the PSM sync flag is set to false, the MME will not send a notification to SCS on every TAU request and Attach request. If the PSM sync flag is set, then the MME also sends a notification to SCS on every TAU request and Attach request.

When the SCS wants to change the MT data periodicity or Delay Tolerance values, it sends the indication to MME via MTC-IWF with new values. The MME overwrites the old values with new values in UE context. If the SCS wants to withdraw these parameters, it sends an indication to MME via MTC-IWF with "Action" AVP set to "delete". The MME deletes these values from the UE context. Deletion of these values means that the SCS does not want to influence or coordinate the PSM status of the UE. The SCS may also disable the "PSM Sync Flag" and "PSM Disable Flag" by setting their values to "Disable" in the 'Device Characteristics Exchange Request'.

Figure 5:
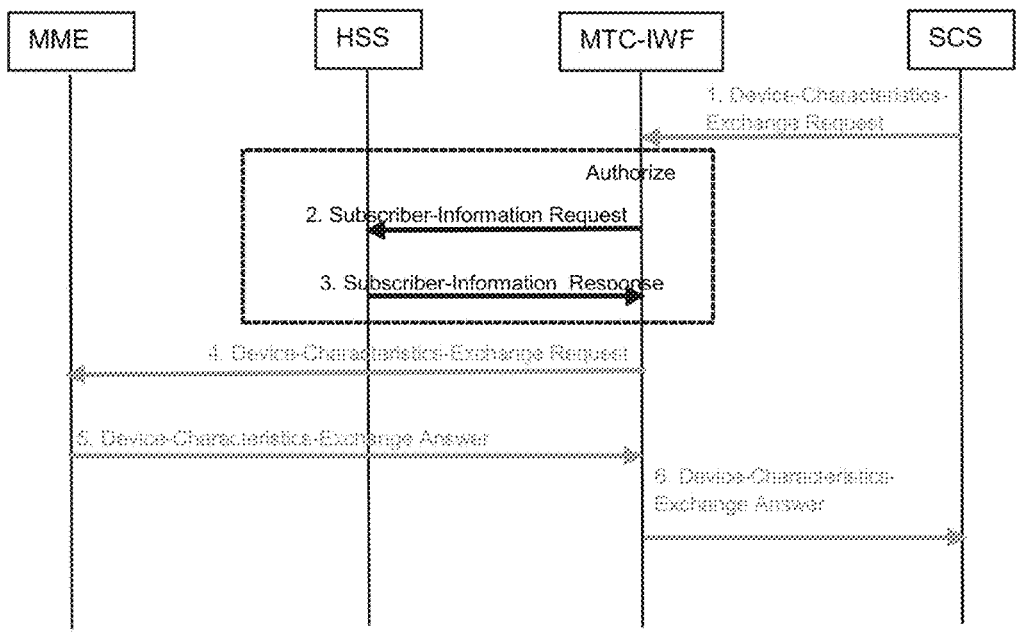
FIG. 5 illustrates a call flow where a service capability server (SCS) sends device periodicity characteristics to the MME according to an embodiment.

According to an exemplary embodiment as illustrated in FIG. 5, the SCS sends the device periodicity characteristics to the MME via the MTC-IWF and over the Tsp interface. Each of the steps in FIG. 5 is denoted by an Arabic numeral. In Step 1, the SCS sends a Device-Characteristics-Exchange (DCE) Request command to the MTC-IWF over Tsp. The DCE Request message can have the following Information Elements (IE)s: (i) External Identifier; (ii) SCS address; and (iii) Device characteristics (which is a grouped AVP) including (a) Action—add/delete and (b) Infrequent MT including (1) a 'Delay Tolerance value' for MT traffic, e.g., latency for SCS initiated communication, indicating how much delay is acceptable for MT data; (2) 'Periodicity of MT communication' which indicates the periodicity of MT data relative to a particular time.

Moreover, the IEs include (iv) PSM sync flag—Enable/Disable—which indicates if the SCS is to be kept in sync about UE's PSM status; (v) PSM disable flag—True/False—which indicates the UE has to be prevented from entering PSM; and (vi) Enhanced data handling flag—Enable/disable—which indicates that the UE is a PSM capable device and that enhanced buffering at SGW and data handling at eNodeB is to be enabled for the UE.

According to Steps 2 and 3, the MTC-IWF checks whether the SCS is authorized to perform this operation in the HSS. If the check fails, the MTC-IWF sends a 'Device Characteristics Exchange' (DCE) Answer message with a cause value indicating the reason for the failure condition and the flow stops at this step. Otherwise, the HSS sends the Subscriber Information Response (IMSI and/or MSISDN and related "Routing information" including the serving node(s) identities) message to the MTC-IWF.

In Step 4, the MTC-IWF forwards the DCE message to MME. The MME adds or deletes the UE characteristics from the UE context based on the "action" in the attribute value pair (AVP) of the "Device Characteristics" grouped AVP. The MME stores the "PSM Sync flag" in UE context, when the "PSM Sync Flag" is set to "enable". If the "PSM Sync Flag" is "disable", it clears the flag from the UE context. Moreover, the MME also stores the "PSM disable flag" in UE context, when the "PSM disable Flag" is set to "True". If the "PSM Disable Flag" is "false", it clears the flag from the UE context. It also stores the "Enhanced data handling flag" in UE context, when the "Enhanced data handling Flag" is set to "Enable". If the "Enhanced data handling flag" is "disabled", it clears the flag from the UE context.

In Step 5, the MME acknowledges to the MTC-IWF that it has successfully added/deleted device characteristics of the UE by sending a Device-Characteristics-Exchange-Answer command with result code success.

In Step 6, the MTC-IWF acknowledges to the SCS that MME has successfully updated device characteristics of the UE by sending a Device-Characteristics-Exchange-Answer command with result code success. If the "Enhanced data handling flag" has been successfully set to 'enabled' at HSS/MME, the SCS may configure application/transport level retransmission timers to be longer than usual.

Figure 6:
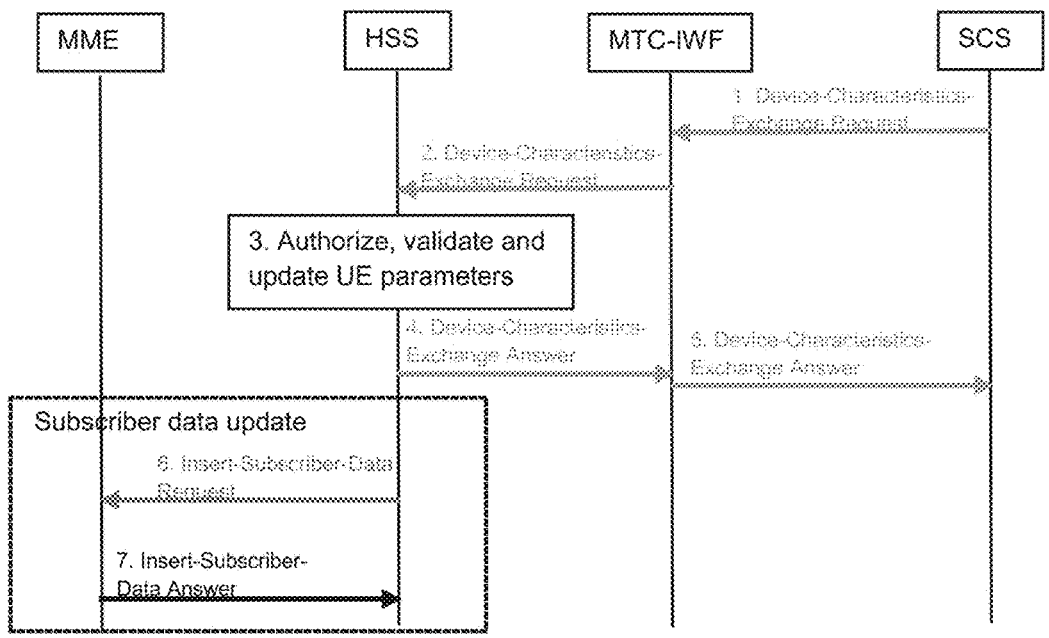
FIG. 6 illustrates another call flow where a SCS sends device periodicity characteristics to the MMM according to an embodiment.

In an alternative embodiment, the MTC-IWF sends UE parameters to the HSS and the HSS pushes the updated parameters to the MME. In particular, the HSS adds new fields to the existing Insert-Subscriber-Data Request/Answer or Delete-Subscriber-Data Request/Answer messages. An embodiment is shown in FIG. 6. Each of the steps in FIG. 6 is denoted by an Arabic numeral. In particular, Step 1 is similar to that described above in FIG. 5. When the SCS wants to update the device characteristics of a UE to CN, it sends a Device-Characteristics-Exchange (DCE) Request command to the MTC-IWF over Tsp. The DCE Request message can have one or more of the IEs discussed above.

In Step 2, the MTC-IWF forwards the Device-Characteristics-Exchange Request command message to HSS/HLR/UDR over S6m/Ud interface.

In Step 3, the HSS validates, provides authorization, and indicates that the SCS is allowed to update the UE's characteristics. The HSS makes the updates to the UE's subscription information accordingly. If validation and authorization check succeeds, then based on the "action" AVP in "Device Characteristics" grouped AVP, the HSS adds or deletes the UE characteristics from the UE profile. It stores the "PSM Sync flag" in UE subscription, when the "PSM Sync Flag" is set to "enable". If the "PSM Sync Flag" is "disable", it clears the flag from the UE subscription.

The HSS also stores the "PSM disable flag" in UE subscription. It also stores the "Enhanced data handling flag" in UE context.

On the other hand, if the validation and authorization check fails, the HSS sends a Device-Characteristics-Exchange Answer command message with a cause value indicating the reason for the failure condition. MTC-IWF forwards the Device-Characteristics-Exchange Answer command message with the cause value indicating the reason for the failure condition to SCS and the flow stops at this step.

Next, the HSS acknowledges to the MTC-IWF that it has successfully added/deleted device characteristics of the UE by sending a Device-Characteristics-Exchange-Answer command with result code success (Step 4). In Step 5, the MTC-IWF acknowledges to the SCS that HSS has successfully updated device characteristics of the UE by sending a Device-Characteristics-Exchange-Answer command with result code success. If the "Enhanced data handling flag" successfully has been set to "enabled" at HSS/MME, the SCS may configure application/transport level retransmission timers to be longer.

In a further embodiment, if the UE is attached, then the HSS may update the subscription data to the serving node (serving MME) using an 'Insert-Subscriber-Data Request' or a 'Delete-Subscriber-Data Request' (Step 6). In Step 7, the serving node (serving MME) acknowledges to the HSS by sending an 'Insert-Subscriber-Data Answer' or a 'Delete-Subscriber-Data Answer' command with result code success.

According to another alternative embodiment, the SCS may directly exchange the 'Device-Characteristics-Exchange request/answer' messages with the UDR/HSS over the Mh interface. The call flow and procedure for this case is similar to the protocols discussed above except the MTC-IWF will be removed and the SCS directly sends the message to the HSS and the HSS directly sends the replies to the SCS over the Mh interface.

In another embodiment, in the case of the User Data Convergence (UDC) architecture, the device characteristics may be written to the User Data Repository (UDR) as temporary data. The HSS FE and the MME FE can read the data characteristics directly. Also, the MME can subscribe to the device characteristics that are stored in the UDR so that the MME will be notified whenever updates are made.

MT Data Waiting—Availability Subscription

According to another aspect of the present application, an SCS may send a pre-trigger using existing 'Device-Action-Request' message to a UE. The MTC-IWF sends this request to serving MME in a new 'Device-Availability-Subscription-Request' message. The SCS may subscribe to MME so as to be notified when the device becomes reachable. The SCS may also set/reset a new "MT data waiting flag" in the MME to enable/disable notifications on every TAU and attach request.

MT Data Waiting Context refers to a context maintained by the MME for the UE, where the MME stores a MT data waiting flag, a validity timer and one or more SCS addresses. The SCS can set these parameters using a pre-trigger when SCS intends to send MT data to a UE in PSM. The MME sends UE availability notification to SCS on TAU request and attach request for the UE, which has MT data waiting flag set to true in this context.

In particular, the SCS uses Device Triggering protocols to transmit information to the UE via the 3GPP network to trigger the UE to perform application-specific task including initiating communication with the SCS or an AS connected to the SCS. Device Triggering is required when an IP address for the UE is not available or not known the SCS/AS.

In one embodiment, the device trigger message contains information that allows the 3GPP network to route the message to the right UE/device and the UE/device to route the information to the right application. The information destined to the application is referred to as the Trigger payload. The UE needs to be able to distinguish a Mobile Termination (MT) message carrying device triggering information from any other type of messages.

According to another embodiment, the SCS may send a validity-timer AVP with the Device-Action-Request message. The MME clears the "MT data waiting flag" after the expiry of validity-timer. After the flag is cleared, the MME does not notify the SCS on TAU request or attach request from UE. Moreover, the MME stores the SCS address, MT data waiting Flag in MT data waiting context in the UE context. If there are multiple SCSs providing different values, then all these values can be stored in the UE context.

If the MT data waiting flag is set, then the MME sends a notification to the SCS on every TAU request and Attach request. MME can use the SCS address to send this notification to SCS via MTC-IWF. When the SCS wants to recall/replace the trigger, it sends the indication to MME via MTC-IWF with new values. MME deletes/overwrites the old values with new values in UE context.

Figure 7:
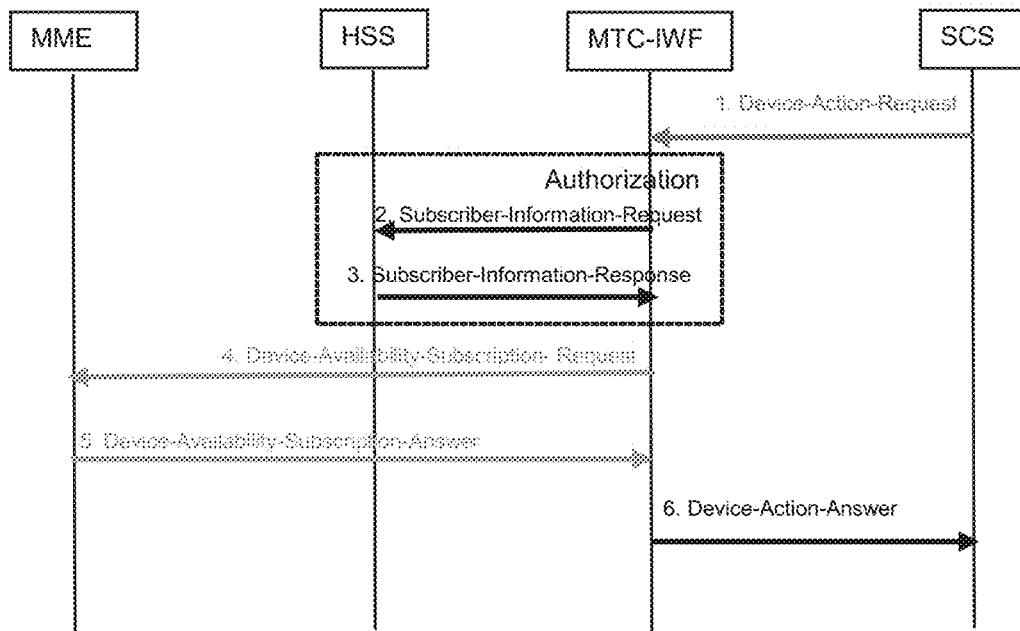
FIG. 7 illustrates a pre-triggering call flow according to an embodiment.

According to an exemplary embodiment as illustrated in FIG. 7, a call flow for a new procedure where the SCS sends the pre-trigger to the MME via the MTC-IWF and over the Tsp interface is described. Each of the steps in FIG. 7 is denoted by an Arabic numeral.

According to Step 1, when the SCS wants to trigger a UE which may be in PSM, it sends a 'Device-Action-Request' (DAR) command to the MTC-IWF over Tsp. The DAR message can have the following IEs: (i) External Identifier; (ii) SCS address—SCS address is sent to the CN, this is used by the CN (MME) to send notification back to SCS; (iii) an indicator to use the pre-trigger procedure.

Alternatively, the SCS may send the DAR message without an indication that the pre-trigger procedure should be used. The MTC-IWF may recognize that the target UE could be in PSM and the MTC-IWF could then decide to send to proceed with the pre-trigger procedure and send the 'Device-Availability-Subscription-Request' to the MME.

In Steps 2 and 3, the MTC-IWF checks whether the SCS is authorized to perform this operation. If this check fails, the MTC-IWF sends a 'Device-Action-Answer' message with a cause value indicating the reason for the failure condition and the flow stops at this step. Otherwise, the HSS sends the 'Subscriber Information Response' (IMSI and/or MSISDN and related "Routing information" including the serving node(s) identities, cause) message.

Next, in Step 4, the MTC-IWF sends the 'Device-Availability-Subscription-Request' message to MME. Based on the "Action-type" AVP, the MME adds/updates/deletes the trigger parameters from the UE context. It stores the "MT data waiting Flag" in "MT data waiting context" in UE context, when the "Action-type" is set to "Device Trigger Request/Device Trigger Replace." It also maintains a validity-timer for this trigger. If the "Action-type" is "Device Trigger Recall", it clears the flag from the UE context.

In Step 5, the MME acknowledges to the MTC-IWF that it has successfully added/deleted trigger parameters of the UE by sending a 'Device-Availability-Subscription-Answer' command with result code success.

In Step 6, the MTC-IWF acknowledges to the SCS that MME has successfully updated trigger parameters of the UE by sending a 'Device-Action-Answer' command with result code success. The MTC-IWF may provide an indication in the 'Device-Action-Answer' to indicate that the pre-trigger procedure was used and that the MTC-IWF has subscribed to the device's availability. Additionally, if the MTC-IWF (and not the SCS) decides to use the pre-trigger procedure, then the MTC-IWF may give the SCS an indication that the trigger payload has been discarded because the pre-trigger procedure was used.

Preferably, the trigger information is not stored at MTC-IWF and rather stored in the serving nodes. This is in accordance with the requirement on the MTC-IWF to be a stateless entity. Also, the device trigger information is stored in the MME and thus the storage requirements are distributed throughout the network. When SMS based triggering is used, all triggers are stored in a centralized location (the SMS-SC).

In another embodiment, when the UE performs a tracking area update, the UE comes out of PSM, and moves to a cell served by a different MME. Then the 'MT Data Waiting' context can also be transferred to the new MME as part of the 'Context Transfer' done during normal TAU. Namely, when the CN sends a notification to the SCS on TAU requests and attach requests, the SCS can immediately trigger the UE and the trigger can be delivered without any overhead to the network. Alternatively, when the CN sends a notification to the SCS on TAU requests and attach request, the SCS can immediately send the UE mobile terminated data over the user plane, i.e., over the SGi reference point.

Enhancements to TAU Procedure

According to another aspect of the present application, new IEs and new messages introduced in the TAU procedure for efficiently handling the PSM UEs are described. For example, in one embodiment, the TAU request may be updated to send a 'bearer status' to the MME. If the MME understands that the SCS wants to send MT data to the UE, the MME may use the bearer status to activate all of the bearers. The MME may also increase the UE's T3440 timer and keep it in connected state for data delivery.

In another embodiment, when a UE changes MME's, the context response and update location ACK messages may be updated to also contain UE device characteristics including but not limited to, "PSM sync flag", "PSM disable flag", "MT data waiting context" and associated SCS addresses. These new parameters are sent to the new serving MME in addition to the existing UE context from HSS/old MME.

In yet another embodiment, a new 'Device Availability Notification Request/Answer' is employed to notify and coordinate with an SCS about the UE's PSM parameters. PSM parameters refer to Active timer and Periodic TAU Timer values of a PSM UE. A PSM UE sends its PSM parameters to the MME on a TAU request or attach request if/when it intends to enter PSM mode. The MME may modify these values and send them back to UE.

As discussed above, the SCS may subscribe to the MME. The MME will coordinate with the SCS on every TAU and attach request. The selection criteria in the CN for the 'Periodic TAU Timer' and the 'Active Timer' may be updated with inputs (device characteristics) provided by the SCS. If the SCS has knowledge of the periodic MT data and prefers to align the UE's active timer and Periodic TAU timer with MT data periodicity, then the SCS may send these values to the MME (via the MTC-IWF) using the 'Device-Characteristics-Exchange Request' as previously discussed. The SCS may set "PSM sync flag" in this request, if it wants to be notified every time UE is active. If the SCS sets the "MT data waiting flag" in the CN, then the CN also sends this notification to the SCS about UE availability. The SCS will also be able to control how long the UE goes into PSM as well as how long the PSM will remain active. The SCS may also prevent the UE from going into PSM mode.

According to another embodiment, the SCS may also send the payload with the 'Device Availability Notification Answer message', when the SCS has MT data waiting and does not have UE contact information. Conversely, if the SCS has UE's contact information, it may send the data to UE via the SGi reference point after sending the 'Device Availability Notification Answer message,' message because the UE will be active and able to receive the MT data. If the SCS includes a payload in the 'Device Availability Notification Answer message' then the TAU accept may be updated to carry the small data to UE. Alternatively, the MME may deliver this payload in a NAS down link (DL) transfer message.

Figure 8:
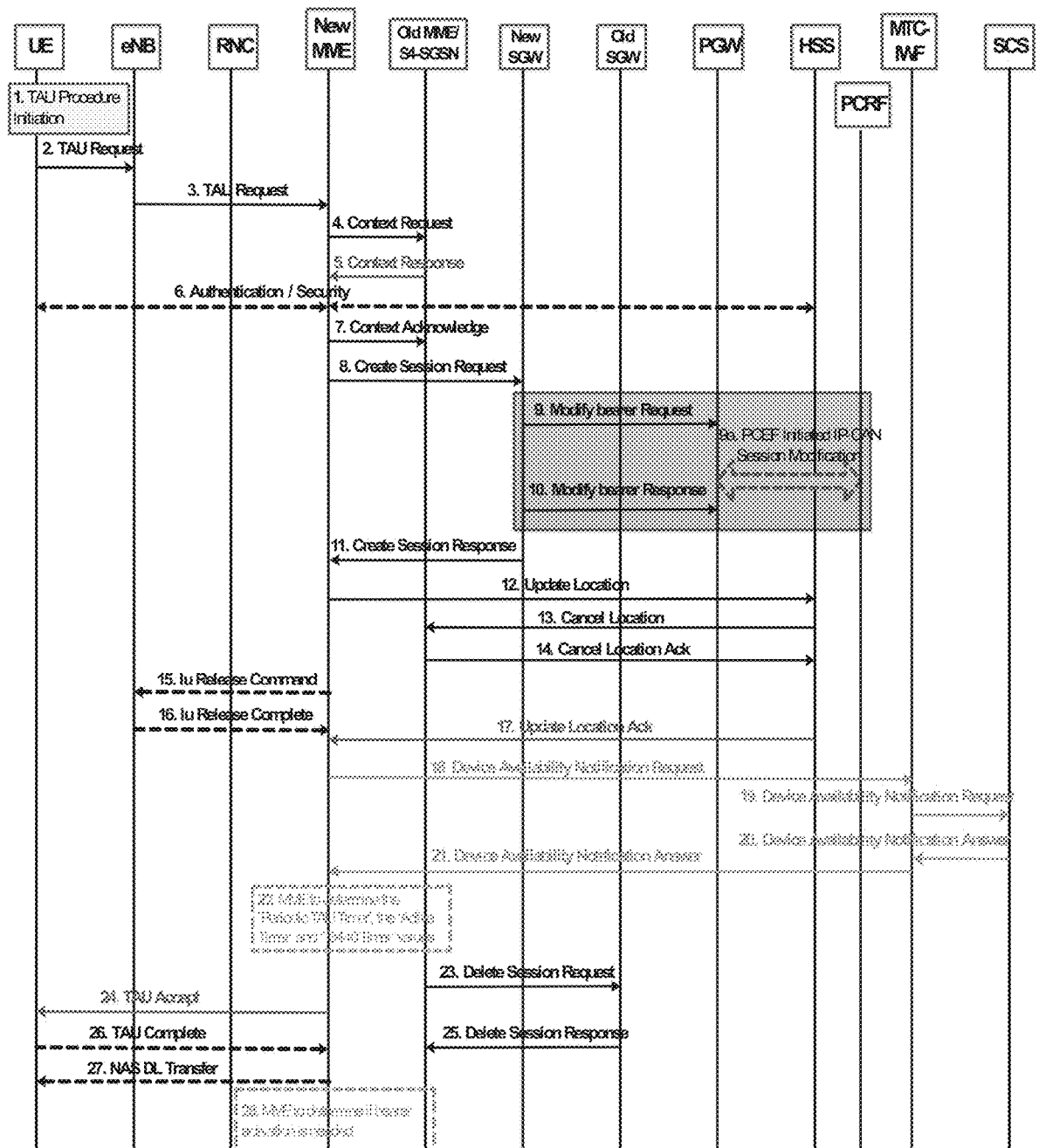
FIG. 8 illustrates a tracking area update (TAU) call flow according to an embodiment.

In an exemplary embodiment as shown in FIG. 8, protocols for enhancing the TAU are described. Each of the steps is denoted by an Arabic numeral in FIG. 8. In Step 1, the UE initiates TAU procedure. Then, the UE sends the TAU request to eNodeB (Step 2). Here, a PSM UE can be mandated to provide the EPS bearer status in the TAU request when it comes out of PSM mode to let the MME know which bearers are active in the UE. Next, the eNodeB sends the TAU request to MME (Step 3). If the MME is a new MME and does not have the UE's context, then the new MME sends a Context Request to the old MME (Step 4). In turn, the old MME sends the UE's context to new MME (Step 5) Apart for the regular UE context, it will also contain UE device characteristics as previously discussed which includes one or more of an "Enhanced Data Handling Flag", "PSM sync flag", "PSM disable flag", "MT data waiting flag" and associated SCS addresses.

Steps 6-16 will not be discussed in detail. Step 16 encompasses authentication/security. Step 7 illustrates a context acknowledgment between the new MME and Old MME. Step 8 illustrates create a session request from the new MME and the new SGW. Steps 9 and 10 illustrate the modify bearer request and response, respectively, between the new SGW and PGW. Step 11 illustrates create a session response from the new SGW and the new MME. Step 12 illustrates an update location between the new MME and HSS. Steps 13 and 14 illustrate a cancel location and acknowledgment, respectively, between the HSS and old MME. Steps 15 and 16 illustrate a 1u Release command and 1u release complete, respectively, between the eNB and new MME.

In Step 17, the 'Update Location Ack' message on the S6a reference point is modified to transfer new parameters in the UE subscription. This message is used to send subscription information from the HSS to the MME. In order to support this feature, new subscriber data fields are provided including but not limited to new subscription fields, such as UE device characteristics, a PSM disable flag, a PSM sync flag, associated SCS addresses, and MT data waiting context. If the UE context in MME has a PSM Sync Flag enabled and/or "MT data waiting Flag" enabled in the MT data waiting context, then the MME sends a "Device Notification request" to the MTC-IWF with addresses of all SCSs to notify about the UE's connected status (Step 18). This message may contain one or more of the following information elements: (i) UE Identity: IMSI/External ID/MSISDN; (ii) SCS Address List; (iii) Active Timer: The current value of the active timer stored in MME for the specific UE; (iv) Periodic TAU timer: The current value of the periodic TAU timer stored in the MME for the specific UE; and (v) Cause: TAU Request.

Thereafter in Step 18, the MTC-IWF forwards the 'Device Availability Notification Request' to the SCS. The MTC-IWF may change the UE identity, e.g., IMSI or MSISDN, etc., to an External ID using HSS Enquiry or by checking information cached in the MTC-IWF. MTC-IWF derives the device reachable duration and device non-reachable duration from received active timer and periodic TAU timer values. The MTC-IWF also maps the received cause value to the set of cause values that can be understood by the SCS. This message may contain one or more of the following information elements: (i) External Identifier; (ii) Type: Information Message/Request message; (iii) Device reachable duration: calculated by MTC-IWF; (iv) Device non-reachable duration: calculated by MTC-IWF and (v) Reason. Moreover, the MTC-IWF sends the Device Availability Notification Request message to all the SCS in the SCS Address List and starts a guard timer.

Next in Step 20, the SCSs respond to the MTC-IWF with a 'Device Availability Notification Answer'. The SCS, upon receiving the PSM parameters, compares them with the existing values and checks if the values need to be modified. Namely, expected M2M data traffic and application scenarios may be considered for modifying values. Based on the PSM parameters, the SCS may also schedule the MT data traffic to match the UE's state transitions. The modified device reachable and non-reachable duration may be suggested in the 'Device Availability Notification Response' message. The 'Device Availability Notification Response' message contains one or more of the following information elements: (i) Proposed Device reachable duration; (ii) Proposed Device non-reachable duration; and (iii) PSM disable flag—True/False—indicates the UE has to be prevented from entering PSM. SCS can also send the payload with this message, when SCSs wants to trigger the UE.

In Step 21, the MTC-IWF waits for the responses from the SCSs. It then collects all of the responses and calculates the new active timer and periodic TAU timer using all received device reachable and non-reachable duration from different SCS and constructs the response with the following information elements: (i) UE Identity: IMSI/External ID/MSISDN; (ii) Proposed Active Timer: value of the active timer calculated at the MTC-IWF; and (iii) Proposed Periodic TAU timer. The MME considers the values proposed by the SCS and either recalculates new values or accepts the suggested values. If the message carries a payload, which can be delivered through NAS signalling at MME, then the MTW-IWF also forwards the payload to MME in "Device Availability Notification Answer" message.

In Step 22, the MME makes its decisions based upon the following parameters (i) Periodic TAU Timer; (ii) Active Timer; and (iii) T3440 Timer. The following considerations are made. The first consideration is whether the timer request made by the UE in TAU Request. The second consideration is whether the device characteristics information provided by the SCS as per the updates was performed using the 'Device Characteristics Exchange'. The third consideration is whether the 'Device Notification Answer' was received from the SCS. The 'active timer' may be chosen based on the highest value provided and the 'periodic TAU timer' may be based on the lowest value provided. Fourth, the MME may decide whether to increase the 'T3440 Timer' and keep the UE in connected mode for MT data or to increase the 'Active timer' and keep the UE in IDLE mode (listening for paging) based on a configured threshold that is determined to be efficient for UE battery consumption.

Steps 23 and 25 discuss deletion of session request protocols. In Step 24, the MME sends a TAU accept to the UE. Here, the MME sends the "Periodic TAU Timer", "Active Timer" and "T3440 Timer" previously calculated in Step 22. If required, the MME may prevent the UE from going into PSM mode (based on a request from the SCS) by providing an 'Active Timer' value of 'FFFF' (a reserved value). If there SCS indicates that there is no pending data, then the UE may be instructed to immediately go into PSM by providing an 'Active Timer' value of '0'. In Step 26, a TAU complete message is sent from the UE to the new MME. In an alternative embodiment, 'small data transmissions' are sent from the new MME to the UE as part of the 'Tau Accept' message. The MME may also indicate that the eNodeB should perform special data handling for the UE if "Enhanced data handling flag" is set to "Enabled" in the UE context. If this flag is sent to eNodeB, then eNodeB may configure the data bearers in a special way (e.g. use RLC AM mode for the data bearers, use lower order modulation scheme, etc.) to increase the chances of successful data delivery to the UE and reduce the chances that a retransmission will be required. This can also help to reduce chances of application level retransmissions from SCS.

Next, in Step 27, the MME may alternatively perform the 'small data transmissions' as part of NAS DL transfer message. MME determines if bearer activation is needed. After TAU Accept the MME can establish the data bearers by initiating an 'S1-AP Initial Context Setup Request' when there is a downlink data (DDN message).

Attach Procedure Changes

Figure 9:
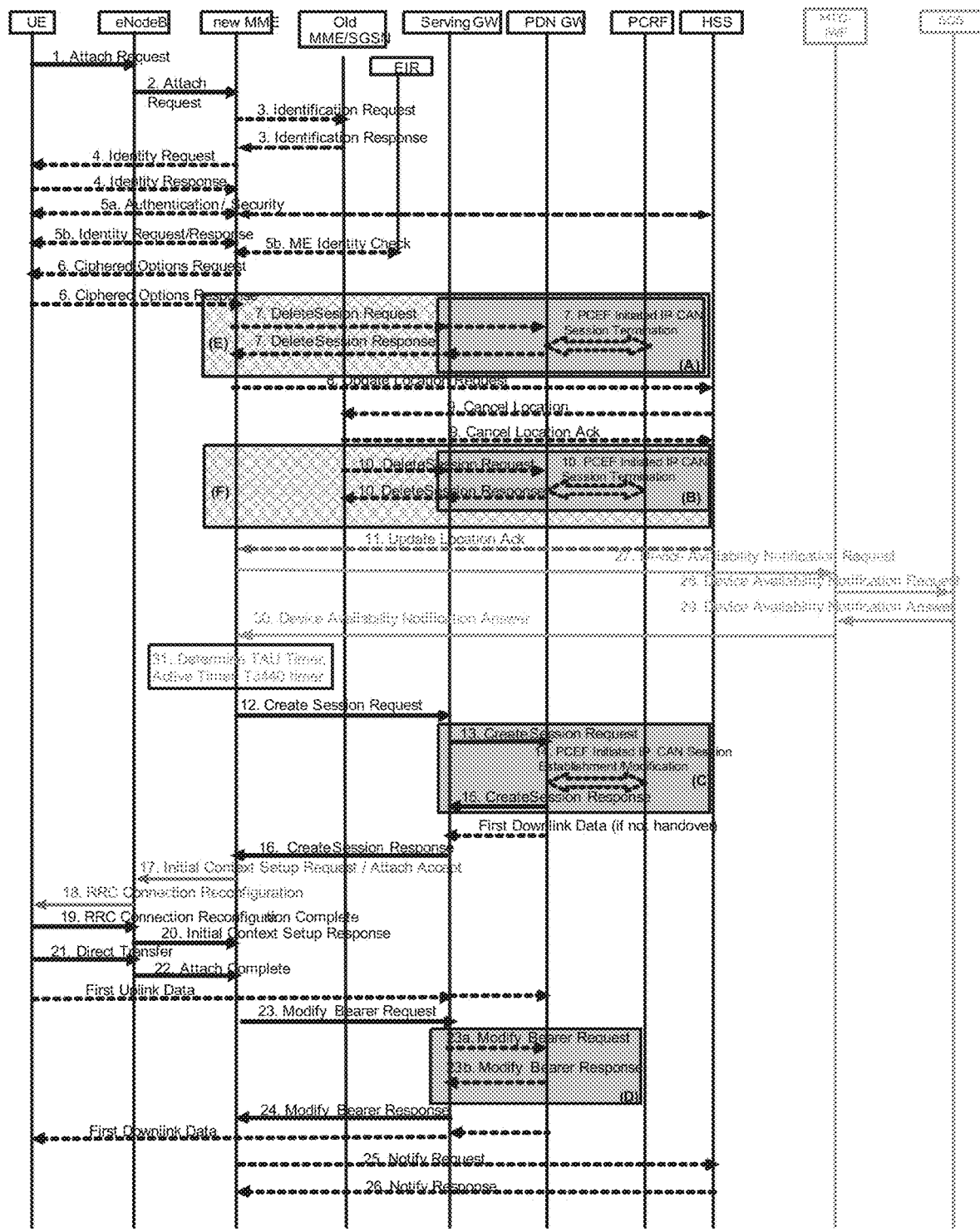
FIG. 9 illustrates an attach call flow according to an embodiment.

According to another aspect of the application changes are proposed to the Attach procedure. Namely, when a UE attaches, the MME may check with the SCS and then make its decision about providing the 'Active Timer' and the 'Periodic TAU Timer' based on the SCS inputs and the device characteristics received from the SCS in "Device characteristics Exchange Request". In an exemplary embodiment, FIG. 9 illustrates the call flows for the Attach procedure. Each of the steps is denoted by an Arabic numeral in FIG. 9. In Step 1, the Attach request is sent to the eNodeB. The attach request is forwarded from the eNodeB to the new MME in Step 2. Steps 3-6 encompass identification requests between the UE, eNodeB, new MME and an old MME. Steps 7-10 describe prompts for deleting session requests.

In Step 11, the 'Update Location Ack message' on the S6a reference point is modified to transfer new parameters in the UE subscription. This message is used to send subscription information from the HSS to the MME. To support this feature, new subscriber data fields are employed as previously discussed in this application. These include one or more of the new subscription fields, such as UE device characteristics, Enhanced data handling Flag, PSM disable flag, PSM sync flag and its associated SCS addresses and MT data waiting context.

Steps 12-16 describe the creation of a session request. In Step 17, the MME sends an 'Initial Context Setup Request/Attach accept' to the UE. The MME sends the "Periodic TAU Timer", "Active Timer" and "T3440 Timer." These calculations are similar to those discussed in Step 22 of FIG. 8. If the Enhanced data handling Flag is set to enable, then MME also sends this flag to the eNodeB in a new information element. If this flag is sent to the eNodeB, then the eNodeB can configure the data bearers in a special way, e.g., use RLC AM mode for the data bearers, use lower order modulation scheme, etc., to increase the chances of successful data delivery to the UE and reduce the chances that a retransmission will be required. This can also help to reduce chances of application level retransmissions from SCS.

In Step 18, the radio resource control (RRC) connection is employed from the eNodeB to the UE. Steps 19-22 describe transfer steps between the UE and new MME. Step 23 and 24 describes the Bearer modification between the new MME and the Serving GW. Steps 25 and 26 describe the notification request/response between the new MME and the SCS.

In Step 27, if the UE context in MME has "PSM Sync Flag" enabled and/or "MT data waiting Flag" enabled, then the MME sends "Device Availability notification request" to MTC-IWF with addresses of all SCSs to notify about the UE's connected status. It may have an AVP indicating the cause of initiation, which is "Attach request." Steps 28-31 are similar to those described above in Steps 19-22, respectively, of FIG. 8.

Enhancements to S1 Release Procedure

According to another aspect of the present application, techniques are described whereby the MME is capable of notifying the SCS/AS when a UE moves from a CONNECTED to IDLE state during the S1. This approach allows the SCS/AS to suggest to the MME whether to delay or advance PSM transitions. This may depend upon the needs of the M2M Application. This may also help the SCS to keep in sync about when the UE enters in and out of PSM state.

It is further proposed that the PSM parameters typically transferred to the UE during Attach or TAU procedure may now also be transferred during the S1 Release procedure. In particular, new messages are introduced on the T5b and Tsp interfaces to inform the SCS about the UEs IDLE or PSM transitions. Moreover, the CN may decide on the PSM parameter, i.e., Active Timer and Periodic TAU timer, based upon the SCS proposed time durations and the reason that caused the S1 release. The CN passes the PSM parameters to the eNodeB using the enhanced UE Context Release Command message. In addition, the RRC Connection Release message is enhanced to carry the PSM parameters provided by the CN. This creates a means of transferring PSM parameters to the UE not only during Attach/TAU but also during S1 Release procedure.

Figure 10:
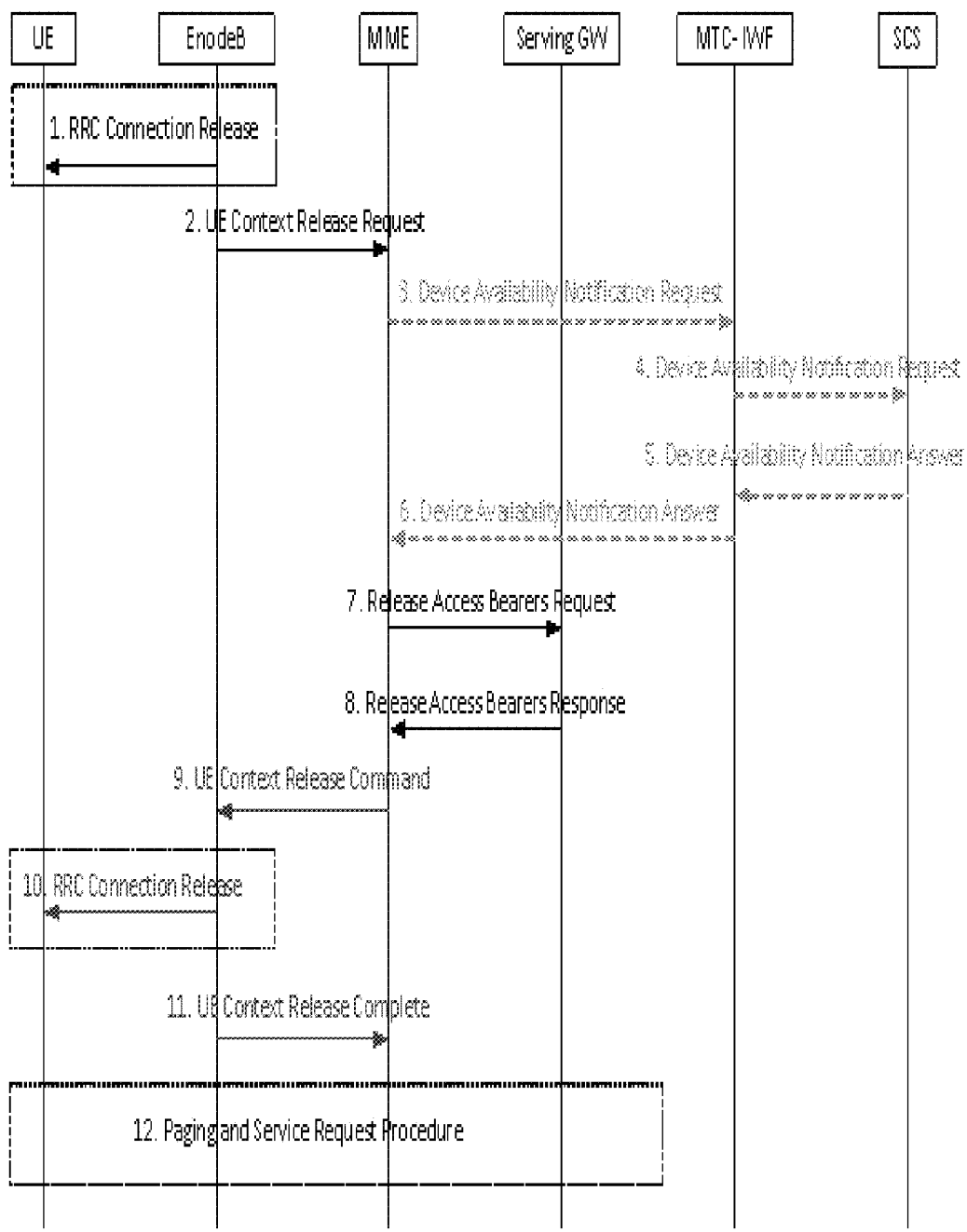
FIG. 10 illustrates a call flow describing enhancements to a S1 release procedure according to an embodiment.

In an exemplary embodiment, as shown in FIG. 10, enhancements to the S1 Release Procedure call flow are described. Each of the steps in FIG. 10 is denoted by an Arabic numeral.

In Step 1, according to some scenarios, the eNodeB may release the UE's RRC connection before requesting the MME for S1 context release. Next, the eNodeB initiates the S1 Release procedure by sending the UE Context Release Request S1AP message (Step 2).

Then MME decides to inform the SCS about the UE's state change based on the criteria below (Step 3). The first criteria is whether the "PSM Sync Flag' has been set in the UE's mobility context at the MME as previously discussed. The second criteria is whether the UE has been marked for PSM activation based on UE's power preference indication or as determined by the CN based on statistical data collection as previously discussed. The MME composes the 'Device Availability Notification Request' message and sends it to the MTC-IWF over the T5b interface. This message contains the following information elements: (i) UE Identity: IMSI/External ID/MSISDN; (ii) SCS Address List: This may be a list of SCS identifiers or a list of SCS IP Addresses; (iii) Active Timer: The current value of the active timer stored in MME for the specific UE; (iv) Periodic TAU timer: The current value of the periodic TAU timer stored in MME for the specific UE; and (v) Cause: The S1 Release cause as indicated by the eNodeB or the cause for which the MME decides to release the S1 connection.

The MME may start a timer to time-out if the SCS/MTC-IWF response takes too long. If the SCS delays the response beyond this time, the MME can proceed with the rest of the S1 Release procedure with the PSM parameters that are currently stored in the UE's context. If the response from the SCS reaches after the guard timer, then the MME may consider the PSM parameters provided by the SCS during the next TAU or Attach Procedure. If the PSM parameters provided by the SCS are critical, e.g., if the SCS wants to prevent the UE from entering PSM, then the MME may initiate paging, e.g., to a single last known eNodeB, to provide the new PSM parameters.

In Step 4, the MTC-IWF constructs a new message 'Device Availability Notification Request' using the incoming message parameters and sends it to the SCS over Tsp interface. MTC-IWF may change the UE identity, e.g., IMSI or MSISDN, etc., to External ID using HSS Enquiry or by checking information that is stored in MTC-IWF cache. MTC-IWF derives device reachable duration and device non-reachable duration based on the received active timer and periodic TAU timer values. The MTC-IWF also maps the received cause value to the set of cause values that can be understood by the SCS. The 'Device Availability Notification Request' message that is sent from MTC-IWF to SCS contains one or more of the following information elements: (i) External Identifier; (ii) Type: Information Message/Request message; (iii) Device reachable duration calculated by MTC-IWF; (iv) Device non-reachable duration calculated by MTC-IWF and (v) Cause. The MTC-IWF fans out the 'Device Availability Notification Request' message to all the SCS mentioned in the SCS Address List sent by the MME.

In Step 5, the SCS upon receiving the PSM parameters checks if the values need to be modified. The expected M2M data traffic, the received reason, and the needs of the M2M application may be considered in this decision. Based on the PSM parameters, the SCS may schedule the MT data traffic to match the UE's state transitions. New Device reachable and non-reachable duration may be suggested in the 'Device Availability Notification Answer' message. This message may contain one or more of the following information elements: (i) Proposed Device reachable duration; (ii) Proposed Device non-reachable duration; (iii) PSM disable flag—True/False—indicates the UE has to be prevented from entering PSM or not.

According to Step 6, the MTC-IWF waits for the responses from all the SCS. It then collects all the responses and calculates the new active timer and periodic TAU timer using all received device reachable and non-reachable duration from the different SCS's and constructs the response to the MME with the following information element: (i) UE Identity: IMSI/External ID/MSISDN; (ii) Proposed Active Timer: value of the active timer calculated at the MTC-IWF; (iii) Proposed Periodic TAU timer. MME will consider the values proposed by the SCS and either recalculates new values or accepts the suggested values.

According to Steps 7 and 8, the MME initiates the release of all activated bearers with the SGW. The SGW releases all the bearers and sends an acknowledgment to the MME. The bearer's protocols were discussed above.

In Step 9, the MME sends the PSM Parameters to the eNodeB in 'UE Context Release Command'. The new information element 'PSM Parameter' is included in the 'UE Context Release Command' S1AP message. The PSM Parameters IE will carry the new active timer and periodic TAU timer. Next, the eNodeB sends the received PSM Parameters to the UE in the RRC Connection Release message by adding the new Information element 'PSM Parameters' which carries the active timer and periodic TAU Timer (Step 10). Next, the eNodeB sends 'UE Context Release Complete' S1AP message to MME and indicates whether the PSM Parameters are passed to the UE by including a new information element 'PSM Parameters passed to the UE' flag (Step 11).

Further in Step 12, the MME checks for 'PSM Parameters passed to the UE' flag in 'UE Context Release Complete' S1AP message and if the flag is "FALSE", MME may decide to page the UE to send the new PSM Parameters. The Paging procedure may be initiated by the MME only if the MME finds that there is a benefit in passing the PSM Parameters to the UE. For example, if there is no substantial change in the PSM timer values, the MME may skip the paging procedure. Also, if the S1 release was triggered by the eNodeB for congestion reasons, the MME might skip the paging procedure. Once the Paging and Service Request procedures are complete, the PSM Parameters are passed to the UE using one of the below mentioned approaches described below.

In one approach, upon finishing Service Request procedure, the UE state transitions to the CONNECTED state and the PSM parameters are transmitted in the downlink data message. In another approach, the PSM Parameters may be transmitted to the UE as an SMS. In a further approach, the Service Request procedure is skipped and the PSM parameters are passed to the UE during paging procedure. After receiving Paging request message, the UE sends the RRC Connection Setup request message to the eNodeB. The eNodeB could be made intelligent to remember that the paging was done to transmit PSM parameters and hence sends RRC Connection Release message to the UE along with the PSM Parameters. Transmitting the PSM parameters to the UE is thus accomplished even though the Paging procedure fails.

Network Initiated PSM

In yet another aspect of the present application, protocols whereby the Core Network (MME) knows the PSM capability of a UE/Device are described. Namely, the UE gives more control to the network by making it aware of its PSM capability and thereby allowing the network to perform any network initiated procedures. In particular, the UE Radio Capability Information is stored in the MME when the UE is in ECM IDLE state. By so doing, the UE doesn't have to transmit this information to the eNodeB every time it transits information or a message from the ECM IDLE to ECM CONNECTED state. Instead, the eNodeB fetches this information from the MME.

According to an embodiment, the UE Radio Capability information stored in the MME could be enhanced to contain an additional information element called the 'PowerSaveMode'. The 'PowerSaveMode' IE indicates whether the UE is PSM capable and thus allowing the network to make decisions on moving the UE to PSM state. The 'UE Capability Information' RRC message and the 'UE Capability Info Indication' S1AP message are enhanced to carry this new information element from the UE to the MME.

According to another embodiment, the CN enables PSM for the UE that indicates low power consumption preference in the UE Assistance Information. If the UE indicates a low power consumption preference during RRC Connection Reconfiguration, the network may consider it as an indication to move the UE to PSM state. This would eventually help the UE to consume less battery power since it's AS functionalities are turned off during PSM.

The UE Assistance Information carrying the low power information to the eNodeB is forwarded to the CN at any time during the CONNECTED state, thus making the CN aware of the UE's power preferences. A new S1AP message 'UE Preference Indication' is introduced to carry the power preference value to the MME. The MME, upon receiving the message, checks the PSM supported flag and decides whether the PSM could be enabled for the UE or not. If the UE's subscription information indicates there is no PSM feature supported, then this message is ignored.

Figure 11:
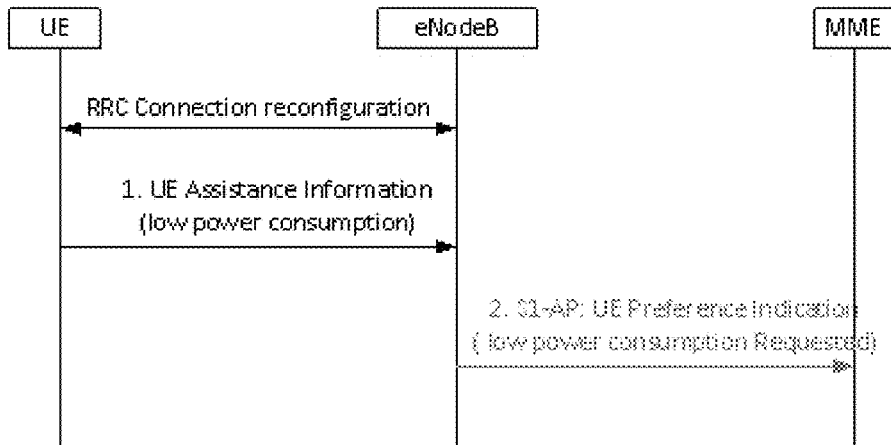
FIG. 11 illustrates a user equipment assistance information call flow to indicate low power preference according to another embodiment.

In an exemplary embodiment as shown in FIG. 11, a call flow is provided for UE assistance information to indicate low power preference. Each of the steps is denoted by an Arabic numeral. In Step 1, if the eNodeB sets the 'powerPrefIndicationConfig' IE to setup in otherConfig of RRC Connection Configuration/Re-Configuration as mentioned in 36.331 and UE supports power preference indication, the UE may transmit UE Assistance Information with power preference set too Low to eNodeB. Then in Step 2, the eNodeB composes a new S1AP message 'UE Preference Indication' with 'low power consumption requested' enumerated value and sends the message to MME. The MME checks the UE subscription details to see if the PSM feature is supported for the UE. The MME may further co-ordinate with the SCS to share the PSM parameters during Attach, TAU or S1 Release procedure.

As described below in Table 2, UE preference indication of S1AP messages is provided. Here, the IE/Group Name includes, for example, Message Type, MMM UE S1AP ID, and eNB UE S1AP ID.

TABLE 2

| IE/Group Name | Presence |
| --- | --- |
| Message Type | M |
| MME UE S1AP ID | M |
| eNB UE S1AP ID | M |
| Low Power Consumption Requested | M |

If the UE does not request an Active timer in the TAU or Attach procedure, or during the S1 Release procedure, the MME may consider the statistical data collected by monitoring ECM state changes. This may include an input to request the SCS for PSM Parameters and activate PSM for the UE. Examples of statistical data include the times of UE state changes, when the UE sends and receives data, etc. The statistical analysis is done at MME only if the network supports PSM feature for the particular UE otherwise no statistical data is collected or analysed.

According to another embodiment, a UE application might control its PSM settings via a new AT command interface modification, to allow the application layer or the OS in the UE to influence the 'Active Timer' value and the 'periodic TAU Timer' value that the UE modem requests in the Attach or TAU procedures. Here, the 'R' interface between the TE and MT on the UE may be updated with new AT commands to enable control of the PSM feature from an application. If the UE wishes to use PSM, it may provide an intended value for the 'Active Timer' and the 'Periodic TAU timer' in the Attach or TAU request. The assumption is that the UE may ask for a 'Periodic TAU timer' that is slightly greater than its periodic data communication (if any) and the 'Active timer' value would allow for any MT data to be delivered. The periodic time value and expected MT data time are determined by the application layer. In particular, a new protocol describes 'PSM Push' informs the MT about the application's preferred 'Active Timer' value and the 'periodic TAU Timer' value. The MT can use these values whenever it sends Attach Request or TAU request to CN. If there are multiple applications, the MT can choose the appropriate values based on inputs from all applications. MT may choose maximum value from all the active timer values provided by applications. MT may also choose the lowest TAU timer value of all the TAU timer values provided by applications.

CN Optimizations for 'Low Mobility' Devices

According to another aspect of the present application, the CN may be configured with information about when and if the UE is expected to be mobile. This section proposes the optimizations at the CN based on the mobility parameters of a particular UE/Device shared by the SCS. The nature of some M2M devices is that they are either stationary or have a limited mobility. For example, a M2M device installed in a street light is stationary and a M2M device installed in a temperature/pressure sensor within an industry remains within a fixed boundary. This particular 'low mobility' characteristic of a UE/Device could be leveraged to provide optimizations in the network.

In one embodiment, the SCS may pass the device characteristics information to the CN using the 'Device Characteristics Exchange (DCE)' message as discussed earlier in this application. The CN stores the device characteristics in the UE subscription information and uses them in the Attach, TAU and Paging procedures. The Device Characteristics Exchange message may be extended with the below mentioned information element to support sharing of mobility characteristics. For example, Device Characteristics (grouped AVP and may 1 or more instances may be present) may include the following aspects of Device Mobility: (i) Mobility status—STATIONARY, MOBILE_WITHIN_A_BOUNDARY; (ii) Mobility status flag—Enabled, Disabled; (iii) Duration—Duration for which the UE would stay in the mentioned mobility status; and (iv) Mobility radius—a value in meters which is applicable if mobility status is stationary.

According to another embodiment, enhancements to the Attach and TAU procedure to assign tracking area ID (TAI) List for UE based on the 'low mobility' characteristic are described. The network may also provide an ECGI List which may be used for more granular tracking and paging. An ECGI list identifies the particular cells that the UE can camp on in 'IDLE' mode without informing the MME by performing a normal tracking area update. When a UE registers to a network, the MME allocates a set of tracking areas to the UE and provides the TAI List in Attach Accept (TAU Accept in case of TAU procedure). The TAI List contains a list of TAs which is close to the UEs current location. The UE does not perform tracking area update procedure while it is moving within the TAs provided in the TAI list.

In addition, the Mobility Status information element contains values which indicate whether the UE is stationary or can roam within a boundary. The Mobility Status flag indicates whether the Mobility Status mentioned is currently valid. For example, when a M2M device installed in a shipping container reaches a warehouse, the respective application server might indicate to the SCS that the Mobility Status is now stationary and set the Mobility Status flag to Enabled. When the shipment starts to move, the Mobility Status flag is set to Disabled. The Duration field could also be used to indicate how long a Mobility Status field is valid. Upon the expiry of duration time, the Mobility Status flag is set to Disabled. The Mobility radius field indicates the roaming area of the M2M device. This parameter is useful for the MME to decide the TAs on which the device may be reachable.

Moreover, when the UEs for which the mobility status and mobility radius is known by the SCS, the SCS shares this information in the DCE message with the MME. The MME stores this information in the subscription details and uses them to provide a minimal TAI List which covers specific TAs instead of giving a full TAI List served by the MME.

The MME may also provide an ECGI List based on Mobility Status and Mobility Radius during Attach or TAU procedures. By providing the ECGI list, the MME has more control and granularity on where the UE is located and this could be used to optimize paging procedure. If the UE moves beyond the provided ECGI list, it triggers TAU procedure. This may also be employed to inform the SCS that the UE has moved beyond the range provided and may invoke any application level functionalities. For example, the SCS can indicate the Mobility Status for a UE as STATIONARY and Mobility Radius set to 100 meters. Then the MME can allocate an ECGI List with one or two cell IDs. Alternatively, if the Mobility Status is set as 'MOBILE-_WITHIN_A_BOUNDARY' and Mobility Radius is set to 5,000 meters, then the MME could deduce a TAI list which covers the UE's roaming region and share it with the UE instead of sharing the entire TAI List served by the MME. Table 3 below indicates the new information element ECGI List to be passed in the Attach Accept NAS message. Moreover, the TAU Accept message is also enhanced to include the ECGI List information element shown in Table 4 below.

TABLE 3

| Information Element | Presence | Format |
| --- | --- | --- |
| Protocol discriminator | M | V |
| Security header type | M | V |
| Attach accept message identity | M | V |
| EPS attach result | M | V |
| Spare half octet | M | V |
| T3412 value | M | V |
| TAI list | M | LV |
| ESM message container | M | LV-E |
| GUTI | O | TLV |
| Location area identification | O | TV |
| MS identity | O | TLV |
| EMM cause | O | TV |
| T3402 value | O | TV |
| T3423 value | O | TV |
| Equivalent PLMNs | O | TLV |
| Emergency number list | O | TLV |
| EPS network feature support | O | TLV |
| Additional update result | O | TV |
| T3412 extended value | O | TLV |
| ECGI List | O | LV |

TABLE 4

| Information Element | Presence | Format |
| --- | --- | --- |
| Protocol discriminator | M | V |
| Security header type | M | V |
| Tracking area update accept message identity | M | V |
| EPS update result | M | V |
| Spare half octet | M | V |
| T3412 value | O | TV |
| GUTI | O | TLV |
| TAI list | O | TLV |
| EPS bearer context status | O | TLV |
| Location area identification | O | TV |
| MS identity | O | TLV |
| EMM cause | O | TV |
| T3402 value | O | TV |
| T3423 value | O | TV |
| Equivalent PLMNs | O | TLV |
| Emergency number list | O | TLV |
| EPS network feature support | O | TLV |

TABLE 4-continued

| Information Element | Presence | Format |
|---|---|---|
| Additional update result | O | TV |
| T3412 extended value | O | TLV |
| ECGI List | O | LV |

Paging Optimizations

According to a further aspect of the application, optimizations for the paging procedure based on the enhancements during Attach and TAU procedure are described. For a stationary UE which is in IDLE state, the MME can do paging only for specific TAs and not on the actual TAI List that the MME serves. Also, for UEs that are mobile and which stay within a particular boundary, the MME could deduce a smaller TAI List which results in the reduction of unnecessary signalling on all other eNodeBs of the TAI List.

According to one embodiment, the MME uses the stored TAI List and/or ECGI List which was generated during Attach or TAU procedure during paging. The S1AP Paging Request message sent from the MME towards the UE may be enhanced to include a new information element called the ECGI List. Table 5 below highlights the new IE sent in the paging message.

TABLE 5

| IE/Group Name | Presence | Range |
|---|---|---|
| Message Type | M | — |
| UE Identity Index value | M | — |
| UE Paging Identity | M | — |
| Paging DRX | O | — |
| CN Domain | M | — |
| List of TAIs | — | 1 |
| >TAI List Item | — | 1 ... <maxnoofTAIs> |
| >>TAI | M | — |
| CSG Id List | — | 0 ... 1 |
| >CSG Id | — | 1 ... <maxnoofCSGId> |
| Paging Priority | O | — |
| List of ECGI | — | 1 |
| >ECGI List Item | — | 1 ... <maxnoofECGIs> |
| >>ECGI | O | — |

In a further aspect of the present application, updated to the service request procedure for supporting enhanced buffering and data handling for PSM capable UEs are described. In particular, new IEs are introduced in the Downlink Data Notification Acknowledge for supporting enhanced data handling for PSM capable UEs, e.g., constrained devices. Downlink Data Notification Acknowledge may be updated to include the "Enhanced data handling" Flag to the SGW. If the MME finds that the UE is in PSM mode and the "Enhanced data handling Flag" is set to "Enabled" in UE context, MME can indicate to SGW for buffering the UE data for a longer time is desired in order to avoid application level retransmissions by SCS.

Figure 12:
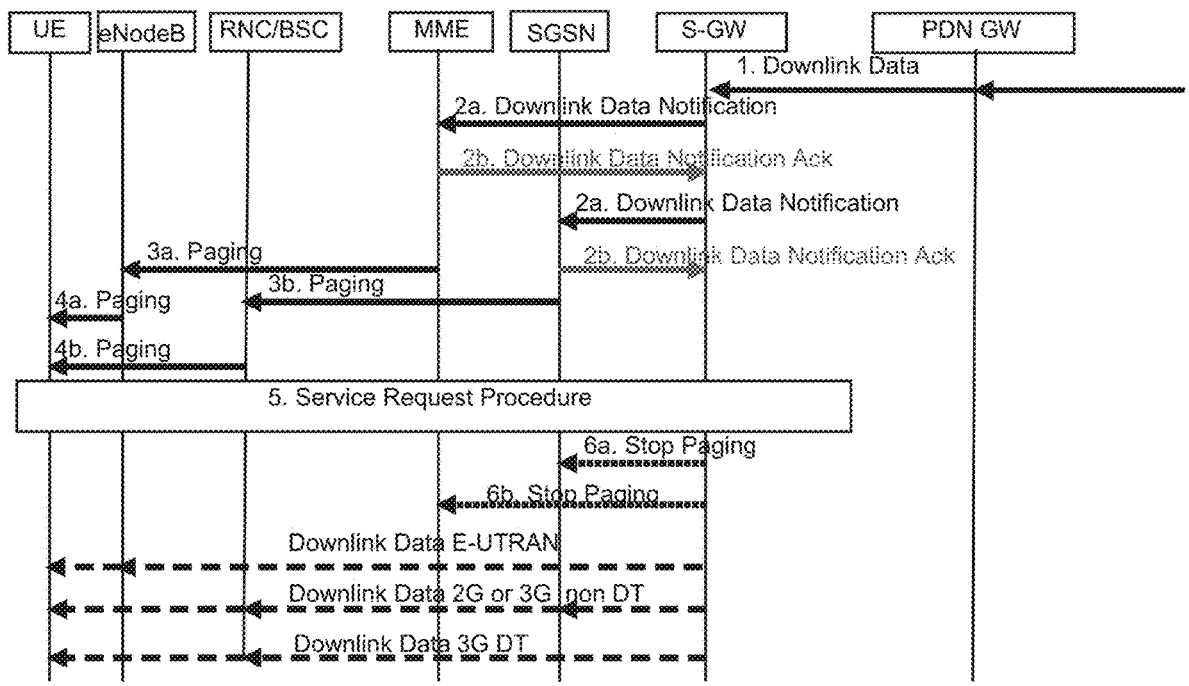
FIG. 12 illustrates a network-initiated service request procedure according to an embodiment.

In an exemplary embodiment as shown in FIG. 12, a network initiated service request call flow is described. Each of the steps is denoted by an Arabic numeral. In Step 1, the Downlink Data is received at a S-GW from a PDN GW. Downlink Data notification is made to the MME in Step 2a. In Step 2b, if the UE is in PSM mode and Enhanced data handling Flag is "Enabled", the MME (or SGSN) may send Downlink Data Notification Acknowledge with "Enhanced data handling" Flag set to Enabled to SGW. The MME (or SGSN) may also send the timer value in a new information element, to indicate the amount of time for which the data has to be buffered. If the UE is expected to be in PSM mode for 20 minutes, the MME (or SGSN) can send 20+ minutes of time to SGW. On receiving this flag and the timer, SGW may decide to buffer the UE's data for specified time to avoid application level retransmissions. Notably, when the UE is in PSM mode, the subsequent steps may not be executed. Steps 3a-b and 4a-b refer to Paging protocols ultimately to the leading to the UE. Step 5 relates to a Service Request Procedure. Steps 6a-b refer to the Stop Paging protocol.

According to another aspect of the present application, new IEs are introduced in the S1-AP Initial Context Setup request for supporting enhanced data handling for PSM capable UEs (constrained devices). In one embodiment, the 1-AP Initial Context Setup request may be updated to include the "Enhanced data handling Flag" to eNodeB. If the MME finds that "Enhanced data handling Flag" is set to "Enabled" in UE context, MME may indicate to the eNodeB that special handling of the UE data is required to avoid application level retransmissions by SCS.

Figure 13:
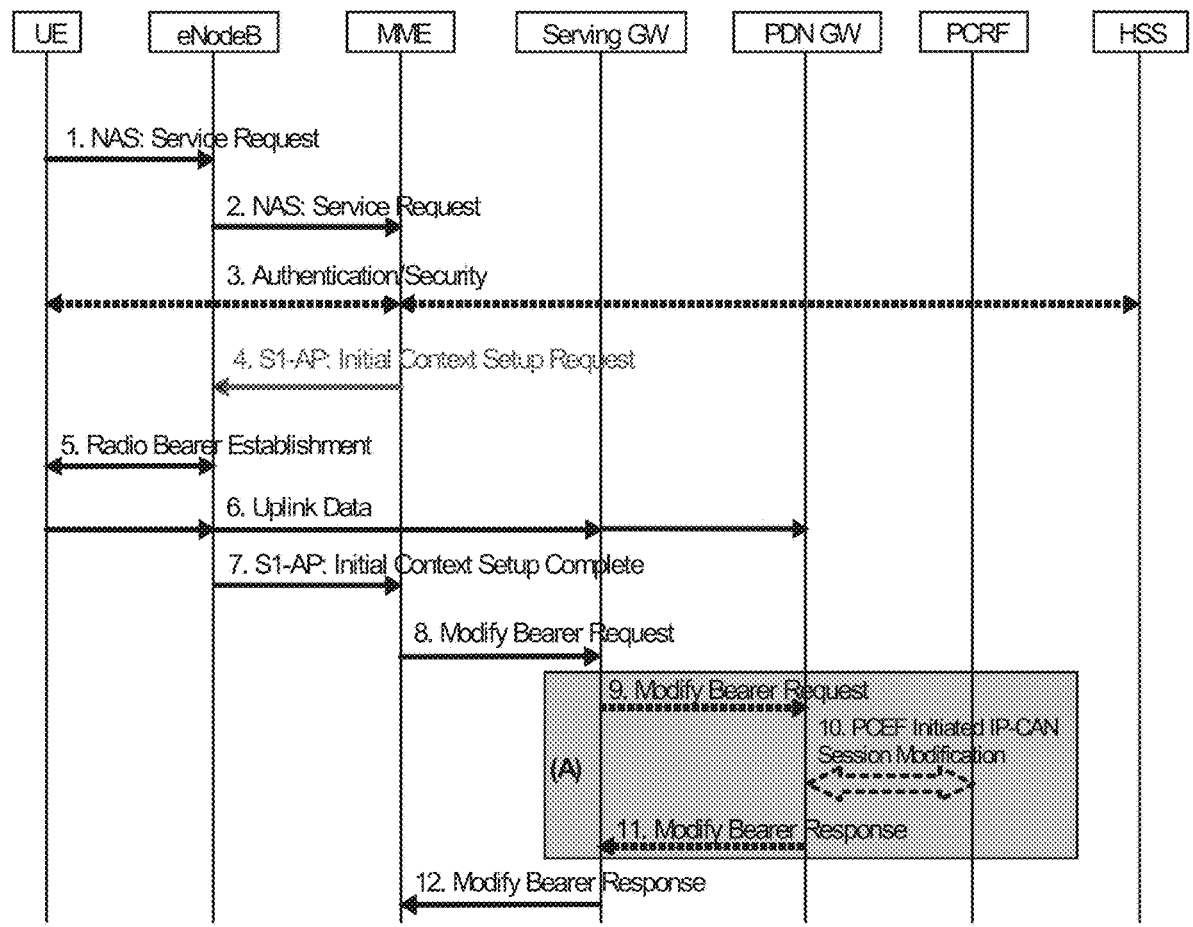
FIG. 13 is a use equipment triggered service request procedure according to another embodiment.

In an exemplary embodiment as illustrated in FIG. 13, UE triggered service request procedures are described. Each step is denoted by an Arabic numeral. After the NAS service request has been transmitted to the MME from the UE and authenticated (Steps 1-3), the S1-AP initial context setup request (Step 4) is performed. Here, the S1-AP Initial Context Setup request can be updated to include "Enhanced data handling" Flag to the eNodeB. If the MME finds that "Enhanced data handling Flag" is set to "Enabled" in the UE context, the MME can indicate this to eNodeB. If this flag is sent to eNodeB, then eNodeB can configure the data bearers in a special way, e.g., use RLC AM mode for the data bearers, use lower order modulation scheme etc.) to increase the chances of successful data delivery to the UE and reduce the chances that a retransmission will be required. This can also help to reduce chances of application level retransmissions from SCS.

According to an alternative embodiment, two new QCI values, say 10 for GBR bearers and 11 for non-GBR bearers, may be introduced. When a PSM capable UE attaches to the network, this new QCI 10 or 11 is used for its bearers, when special data handling is desired for these devices. When a UE is in PSM mode and the downlink data is received at SGW, the SGW may send a DDN message to MME and the MME may respond with timer value for buffering data. The SGW may then buffer the data for desired time based on the timer value provided by MME and also the based on the new QCI value associated with the bearer.

When the PSM capable UE is connected, the eNodeB may perform special data handling for the bearers with new QCI values (10 or 11), e.g., using RLC AM mode for the data bearers, using lower order modulation scheme, etc., to increase the chances of successful data delivery to the UE. This can help to reduce the likelihood of application level retransmissions from the SCS.

According to another alternative embodiment, when a UE is in PSM mode and the downlink data is received at SGW, the SGW sends a DDN message to the MME and the MME may respond with timer value for buffering data. Additionally, MME may indicate the amount of data that it can buffer at MME. If the data received and buffered at SGW is within the data limit indicated by MME, the SGW may forward the data to the MME. The data gets buffered at the MME in this case and can be later delivered using NAS DL transfer message over the SRBs. If MME relocation is required when data is buffered at the MME, the buffered data may also be transferred to the new MME with the Context Transfer procedure.

LWM2M Embodiment

A LWM2M client may include resources that indicate the state, or level, of the client's battery. The LWM2M server may send an observe request to the LWM2M client to indicate that the server should be notified when the battery reaches a certain level. When the client notifies the server of the battery level, the server may inform the client that it is permitted to sleep for a longer time period in order to conserve energy. According to an aspect of the present application, the LWM2M Client's "Connectivity Monitoring" object may be updated with a new resource called "Max Sleep Time". The server may use this new resource to indicate to the client how long it is permitted to sleep and be unavailable for mobile terminated communications. The LWM2M Client may use this "Max Sleep Time" value to configure its PSM settings when it performs a Tracking area update.

Figure 14:
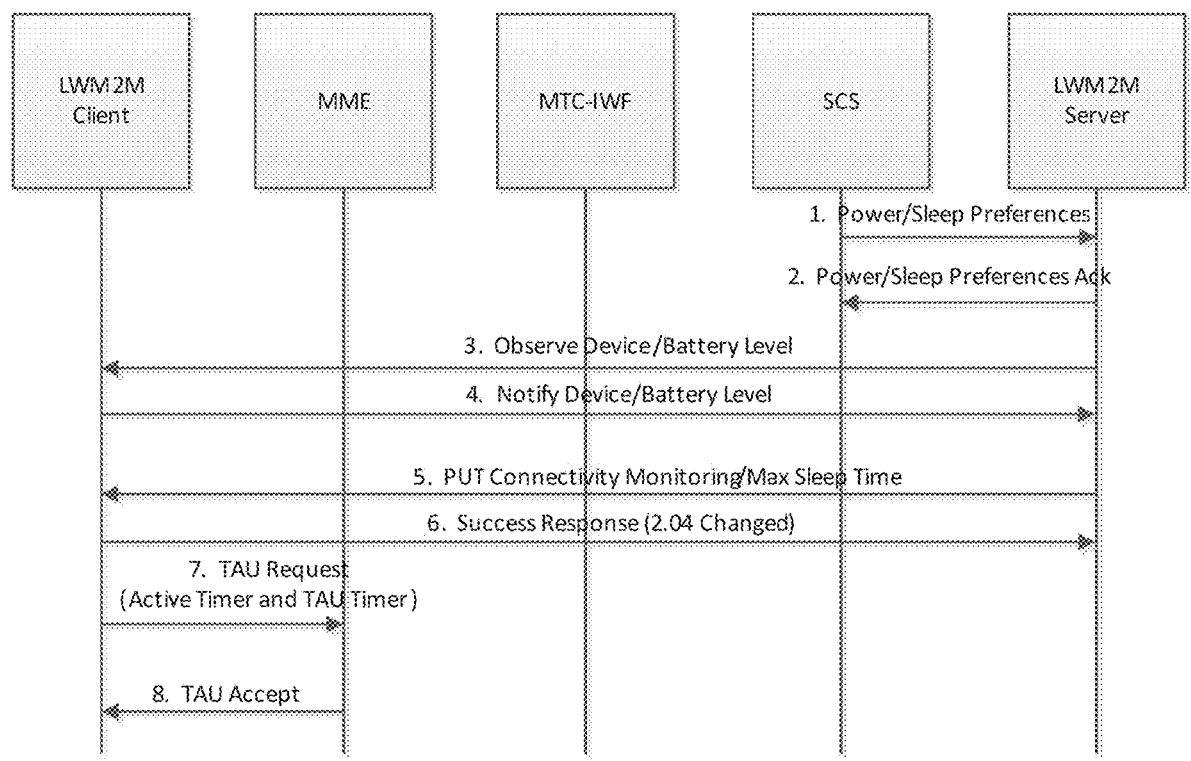
FIG. 14 illustrates a lightweight machine-to-machine (LWM2M) server requests according to an embodiment.

In an exemplary embodiment as illustrated in FIG. 14, LWM2M Server Requests that the Client Adjust its PSM Settings is described by the call flows. Each of the steps is denoted by an Arabic numeral. In Step 1, the SCS uses the M2M Interface to send power and sleep preferences to the LWM2M Server for the client. The SCS may choose to send this message when the UE registers with the SCS or it may choose to modify the Power/Sleep preferences based on some event such as a new application being started, etc. Next, the LWM2M Server acknowledges the preferences (Step 2). Thereafter, the LWM2M Server asks the client to notify the server when the battery level reaches a certain level (Step 3). Then, the client notifies the Server that the battery has reached a certain level (Step 4).

Based on the battery level, the LWM2M server informs the client that it is permitted to sleep for some maximum amount of time (Step 5). For example, the client may be told that it is permitted to go into sleep mode for up to 20 minutes. During sleep mode, the client may not be reachable for mobile terminated communications. Next, the Client may send a response to the server indicating that it's "Max Sleep Time" resource has been updated (Step 6). Thereafter, the Client (UE) will do a tracking area update and provide the MME with an Active Time and TAU Timer that are calculated based on the "Max Sleep Time" that was provided in step 5 (Step 7). For example, if a "Max Sleep Time" of 20 minutes was provided in step 5, then the UE may choose an Active Time of 5 minutes and a TAU Timer of 25 minutes. The LWM2M client may be configured to use an AT command to inform the protocol stack of the desired Active Time and TAU Time. Further, the MME may indicate that it accepts the TAU and new timer values (Step 8).

Figure 15:
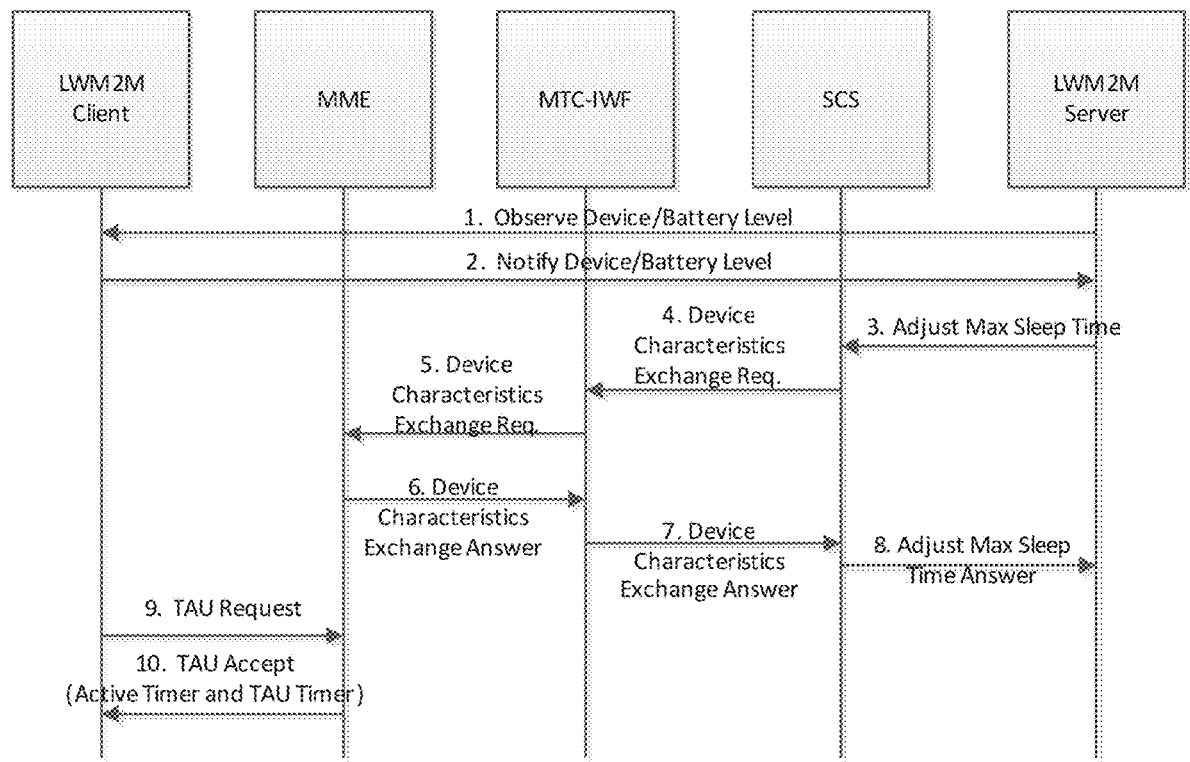
FIG. 15 illustrates a LWM2M server request according to another embodiment.

In an alternative embodiment, if the LWM2M Server has an interface with the core network, then the LWM2M server may use its interface with the core network to request that the UE's PSM settings be adjusted. For instance, FIG. 15 illustrates call flows whereby the LWM2M server requests that the SCS adjust the client's PSM settings. Each of the steps in FIG. 15 is denoted by an Arabic numeral. First, the LWM2M Server asks the client to notify the server when the battery level reaches a certain level (Step 1). Then, the client notifies the Server that the batter has reached a certain level (Step 2). Next, the LWM2M Server sends a request to an SCS requesting that the device's maximum sleep time be adjusted (Step 3). According to Steps 4-7, the SCS uses the device characteristics update procedure as discussed earlier in this application. Thereafter, the SCS acknowledges the LWM2M Server's request to adjust the UE's sleep time (Step 8). Subsequently, the Client (UE) requests a tracking area update (Step 9). Lastly, the MME provides the UE with an Active Time and TAU Timer that are calculated based on the "Max Sleep Time" provided in Step 3. For example, if a "Max Sleep Time" of 20 minutes was provided in step 3, then the MME may choose an Active Time of 5 minutes and a TAU Timer of 25 minutes. It is noted that Steps 3 and 8 above may take place on the M2M Interface between the SCS and the LWM2M Server.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6-15. The computer executable instructions may be stored in a memory and executed by a processor disclosed above in FIGS. 4C and 4D, and employed in devices including UEs, HSSs and SCSs. In one embodiment, a computer-implemented UE having a non-transitory memory and processor operably coupled thereto, as described above in FIGS. 4C and 4D, is disclosed. Specifically, the non-transitory memory has instructions stored thereon for controlling a power savings mode characteristic of a device on the network. The processor is configured to perform the instructions of: (i) receiving a request to update the characteristics of the device on the network; and (ii) updating the characteristic of the device based upon the request; and (iii) sending an acknowledgement that the characteristic has been updated.

In another embodiment, the non-transitory memory includes instructions stored thereon for controlling a power savings mode characteristic of a device on the network. The processor is configured to perform the instructions of: (i) receiving a tracking area update or an attach request from the device on the network; (ii) sending a device availability notification request to a core network interworking function or a service capability server; and (iii) receiving a device availability notification answer from the interworking function or the service capability server.

In yet another embodiment, the non-transitory memory includes instructions stored thereon for supporting buffering and data handling for a power savings mode of a device on the network. The processor, operably coupled to the non-transitory memory, is configured to perform the instructions of: (i) receiving a downlink data notification from a serving gateway; (ii) determining the device is in power saving mode and that an enhanced data handling flag is enabled; and (iii) sending a downlink data notification acknowledgment to the serving gateway including the enhanced data handling flag.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus on a network, the apparatus comprising:
 a non-transitory memory having instructions stored thereon for controlling a power savings mode characteristic of a device on the network; and
 a processor, operably coupled to the non-transitory memory, the processor configured to perform the instructions of:
 receiving a device context information including a Power Saving Mode (PSM) Sync Flag from a core network node, the PSM Sync Flag indicating monitoring type of one or more devices on the network including the device;
 receiving a tracking area update or an attach request from the device on the network; and
 sending a device availability notification request to a core network interworking function.

2. The apparatus of claim 1, wherein the device availability notification request includes information selected from an identification of the device, an address list of service capability servers, an active timer, a periodic tracking area update timer, a cause for the request and combinations thereof.

3. The apparatus of claim 1, wherein the notification request provides notification information of when the device exits power savings mode.

4. An apparatus on a network comprising:
 a non-transitory memory having instructions stored thereon for controlling and monitoring a power savings mode characteristic of a device on the network; and
 a processor, operably coupled to the memory, the processor configured to perform the instructions of:
 a processor, operably coupled to the non-transitory memory, the processor configured to perform the instructions of:
 receiving a first request from a server for monitoring a device and controlling the power mode characteristic of the device on the network;
 receiving a device availability notification request for the device from a network apparatus; and
 sending a second notification for the device to the server.

5. The apparatus of claim 4, wherein the first request, the device availability notification request, and the second notification include information selected from an identification of the device, an address list of service capability servers, an active timer, a periodic tracking area update timer, a cause for the request and combinations thereof.

6. The apparatus of claim 4, wherein the first request includes a Power Saving Mode (PSM) Sync Flag, the PSM Sync Flag indicating monitoring type of one or more devices on the network including the device.

7. The apparatus of claim 4, wherein the notification request and the second notification provide notification information of when the device exits power savings mode.

8. A wireless communication system in a network, the network including a device, a network apparatus, a core network interworking function and a server, the wireless communication system comprising:
 receiving, from a server to the core network interworking function, a first request for monitoring a device and controlling power mode characteristic of the device on the network;
 receiving, from the core network interworking function to the network apparatus, a device context information based on the first request;
 receiving, from the device to the network apparatus, a tracking area update or an attach request; and
 sending, from the network apparatus to the core network interworking function, a device availability notification request.

9. The wireless communication system of claim 8, wherein the device context information including a Power Saving Mode (PSM) Sync Flag, the PSM Sync Flag indicating monitoring type of one or more devices on the network including the device.

10. The wireless communication system of claim 9 further comprising:
 receiving, from the server to the core network interworking function, a request to update the characteristics of the device;
 updating the characteristics of the device based on the request; and
 sending, from the core network interworking function to the server, an acknowledgement that the characteristics has been updated.

11. The wireless communication system of claim 9 further comprising:
 forwarding, from the core network interworking function to the network apparatus, an insert subscriber data request; and
 receiving, from the network apparatus to the core network interworking function, an insert subscriber data answer, wherein a periodic tracking area update timer value is determined based upon the insert subscriber data request.

* * * * *